(12) United States Patent
Hwang et al.

(10) Patent No.: US 9,473,253 B1
(45) Date of Patent: Oct. 18, 2016

(54) ROBUST ACTIVE SELF-INTERFERENCE CANCELLATION IN THE PRESENCE OF EXTERNAL IN-BAND SIGNALS USING GUARD REGION SIGNAL MEASUREMENTS

(71) Applicant: QUALCOMM Incorporated, San Diego, CA (US)

(72) Inventors: Insoo Hwang, San Diego, CA (US); Bongyong Song, San Diego, CA (US); Samir Salib Soliman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/720,517

(22) Filed: May 22, 2015

(51) Int. Cl.
| | | |
|---|---|---|
| H04B 1/10 | (2006.01) | |
| H04B 15/00 | (2006.01) | |
| H04B 1/48 | (2006.01) | |
| H04B 17/24 | (2015.01) | |

(52) U.S. Cl.
CPC .............. *H04B 15/00* (2013.01); *H04B 1/48* (2013.01); *H04B 17/24* (2015.01); *H04B 2001/485* (2013.01)

(58) Field of Classification Search
CPC ................................................... H04B 1/1027
See application file for complete search history.

(56) References Cited

U.S. PATENT DOCUMENTS

| 6,256,486 | B1 | 7/2001 | Barany et al. |
|---|---|---|---|
| 6,684,057 | B2 | 1/2004 | Karabinis |
| 8,477,592 | B2 | 7/2013 | Sutivong et al. |
| 8,902,831 | B2 | 12/2014 | Kuchi et al. |
| 2005/0002324 | A1* | 1/2005 | Sutivong .................. H04L 1/20 370/208 |
| 2010/0165956 | A1* | 7/2010 | Razzell ................. H04L 5/0094 370/338 |
| 2013/0065581 | A1* | 3/2013 | Hwang ................ H04B 17/336 455/422.1 |
| 2013/0237260 | A1 | 9/2013 | Lin et al. |
| 2014/0086162 | A1 | 3/2014 | Rimini et al. |
| 2014/0219449 | A1* | 8/2014 | Shattil ................... H04W 12/08 380/270 |
| 2015/0065064 | A1 | 3/2015 | Hwang et al. |

FOREIGN PATENT DOCUMENTS

| WO | WO-2015105810 | 7/2015 |
|---|---|---|
| WO | WO-2016025338 | 2/2016 |

OTHER PUBLICATIONS

International Search Report and Written Opinion—PCT/US2016/031200—ISA/EPO—Jul. 6, 2016.

* cited by examiner

*Primary Examiner* — David Bilodeau
(74) *Attorney, Agent, or Firm* — Loza & Loza LLP

(57) ABSTRACT

Aspects of the disclosure are directed to interference cancellation. A method of performing interference cancellation in a wireless communications device having a transmitter, a receiver, a coefficient controller and an analog interference cancellation (AIC) circuit includes utilizing the receiver for receiving a signal, wherein the received signal includes an interference signal within a spectral region; measuring the received signal to obtain a measurement of the interference signal within a guard region of the spectral region; and determining a set of coefficients based on the measurement of the interference signal within the guard region.

30 Claims, 12 Drawing Sheets

ROBUST ACTIVE SELF-INTERFERENCE CANCELLATION IN THE PRESENCE OF EXTERNAL IN-BAND SIGNALS USING GUARD REGION SIGNAL MEASUREMENTS

TECHNICAL FIELD

This disclosure relates generally to the field of interference cancellation systems and methods, and, in particular, to self-interference cancellation in the presence of external in-band signals using guard region signal measurements.

BACKGROUND

Advanced wireless devices may have multiple radios that operate on the same, adjacent, or harmonic/sub-harmonic frequencies. The radios may provide access to networks such as a wireless wide area network (WWAN), a wireless local area network (WLAN), a wireless personal area network (WPAN), Global Positioning System (GPS), Global Navigation Satellite System (GLONASS), etc. Some combinations of radios may cause co-existence issues due to interference between the respective frequencies. In particular, when one radio is actively transmitting at or close to the same frequency and at the same time that another radio is receiving, the transmitting radio may cause interference to (i.e., de-sense) the receiving radio. For example, interference may occur between Bluetooth (WPAN) and 2.4 GH WiFi, (WLAN); adjacent band interference between 2.4 GHz WLAN and Long Term Evolution (LTE) band 7, 40, and 41; harmonic/sub-harmonic interference may occur between 5.7 GHz ISM and 1.9 GHz Personal Communications Service (PCS); and an intermodulation issue may occur between around 700 MHz and a GPS receiver.

FIG. 1 is a block diagram illustrating an exemplary analog interference cancellation system 100. Analog interference cancellation (AIC) cancels interference between a transmitter radio and a receiver radio by matching gain and phase of a wireless coupling path signal and in a wired AIC path, as shown in FIG. 1, where $d_t$ is a transmitted signal from a transmitter (aggressor) radio 102, and $h_c$ is a coupling channel (wireless or wired coupling path signal) from the transmitter radio 102 to a receiver (victim) radio 104. AIC 106 attempts to cancel the impact of the coupling channel $h_c$ as reflected via the negative sign on the output of AIC 106.

Interference cancellation techniques are commonly used in wireless communication systems to improve performance where undesired transmit interference (i.e., local interference) couples into a co-located receiver. In the case of a transmit antenna and a receive antenna, an analog interference cancellation (AIC) circuit in the receiver may be used to mitigate the undesired transmit interference by subtracting a filtered copy of the transmit interference (e.g., available from the transmitter) in the receive path to cancel the undesired transmit interference.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to various aspects of the disclosure a method for interference cancellation, including utilizing a receiver for receiving a signal, wherein the received signal includes an interference signal within a spectral region; measuring the received signal to obtain a measurement of the interference signal within a guard region of the spectral region; and determining a set of coefficients based on the measurement of the interference signal within the guard region.

In various aspects, an apparatus for interference cancellation, including a receiver configured to receive a signal, wherein the received signal includes an interference signal within a spectral region; a filter coupled to the receiver, the filter configured to measure the received signal to obtain a measurement of the interference signal within a guard region of the spectral region; and a coefficient controller coupled to the receiver, the coefficient controller configured to determine a set of coefficients based on the measurement of the interference signal within the guard region.

In various aspects, an apparatus for interference cancellation, including at least one processor; a memory for storing a first set of coefficients for initialization, the memory coupled to the at least one processor; a receiver configured to receive a signal, wherein the received signal includes an interference signal within a spectral region, the receiver coupled to the at least one processor; means for measuring the received signal to obtain a measurement of the interference signal within a guard region of the spectral region; and means for determining a second set of coefficients based on the measurement of the interference signal within the guard region.

In various aspects, a computer-readable storage medium storing computer executable code, operable on a device including at least one processor; a memory for storing a first set of coefficients for initialization, the memory coupled to the at least one processor; a receiver coupled to the at least one processor, wherein the receiver is configured to receive a signal and wherein the received signal includes an interference signal within a spectral region; and the computer executable code including instructions for causing the at least one processor to measure the received signal to obtain a measurement of the interference signal within a guard region of the spectral region; and instructions for causing the at least one processor to determine a second set of coefficients based on the measurement of the interference signal within the guard region.

These and other aspects of the present disclosure will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure may include one or more of the advantageous features discussed herein. In other words, while one or more embodiments may be discussed as having certain advantageous features, one or more of such features may also be used in accordance with the various embodiments of the present disclosure discussed herein. In similar fashion, while exemplary embodiments may be discussed below as device, system, or method embodiments it should be understood that such exemplary embodiments may be implemented in various devices, systems, and methods.

DETAILED DESCRIPTION

Figure 1:
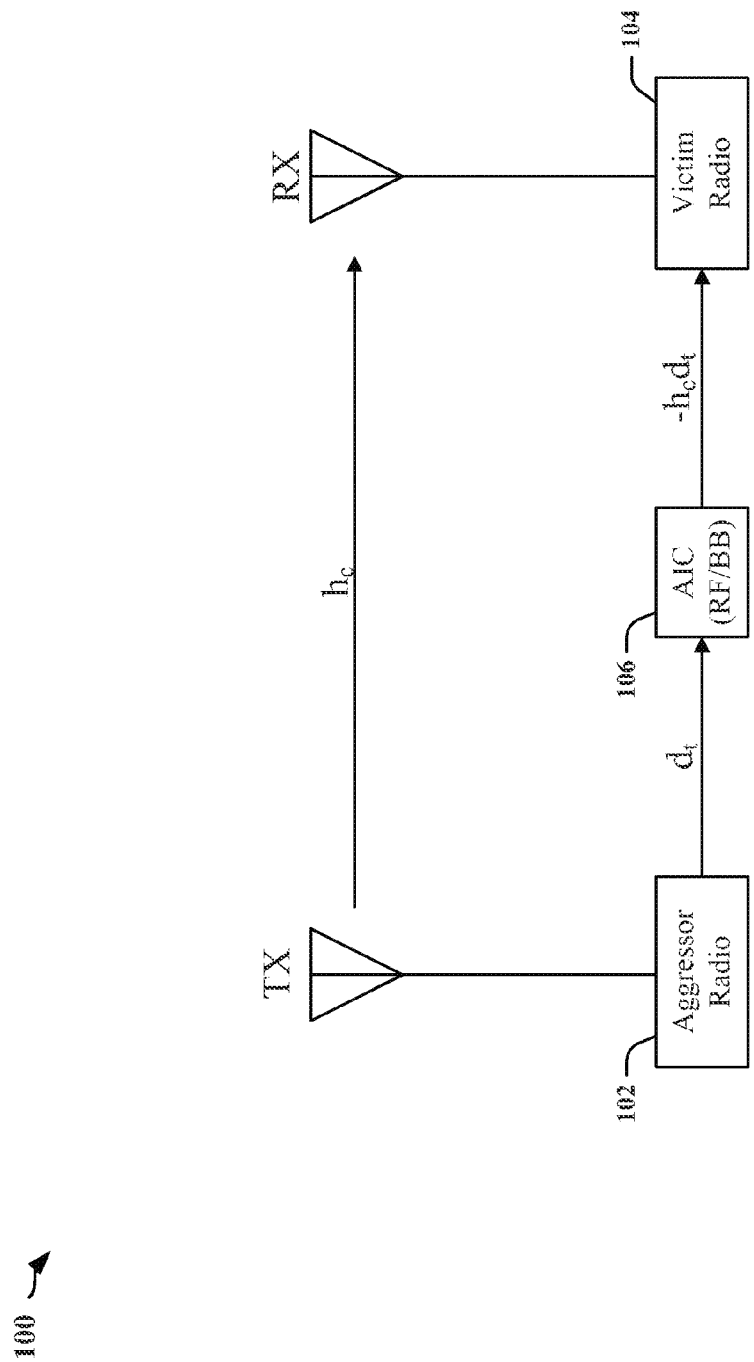
FIG. 1 is a block diagram illustrating an exemplary analog interference cancellation system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to systems and methods for cancelling local interference resulting from transmissions by one radio (transceiver) that affect the receiving performance of a second radio (transceiver). This interference may occur when the first and second radios are operating on the same or adjacent, harmonic/sub-harmonic frequencies, or intermodulation product frequencies. In particular aspects, such as wireless communication devices with a plurality of radios, an interference cancellation system is adaptable for different radio combinations. For instance, for a co-existence issue caused by a first combination of radios, a transmitting radio (e.g., WiFi) may be selected for an input of an interference cancellation (IC) circuit and a receiving radio (e.g., Bluetooth) may be selected for the output of the interference cancellation circuit. For a co-existence issue caused by a second (different) combination of radios, the transmitting radio (e.g., WiFi) may be selected for the input of the interference cancellation circuit and the receiving radio (e.g., LTE band 7) may be selected for the output of the interference cancellation circuit. It should be noted that the terms cancellation (as in interference cancellation) and variants thereof may be synonymous with reduction, mitigation, and/or the like in that at least some interference is reduced.

Interference cancellation circuits may include any one or more of a variety of different filters and interference cancellation techniques. For example, one common interference cancellation circuit uses an analog least mean square (LMS) adaptive filter configured to match the signal in the interference cancellation path with the signal in the coupling path. An LMS adaptive filter may operate such that it mimics a desired filter using filter coefficients calculated to produce the least mean square of an error signal, which may represent the difference between a desired signal and an observed or receive signal. A one-tap LMS interference cancellation filter ideally focuses its peak cancellation energy at the frequency where the power of an interfering signal is at its highest. A DC offset may be applied to the LMS filter to actively steer the cancellation center, with the value of the DC offset being automatically calculated in the digital domain in accordance with a baseband signal derived from the receiver.

In accordance with certain aspects of the present disclosure, least mean square (LMS) filter coefficients (e.g., unknown dc bias) may be determined and provided to an AIC circuit for interference cancellation by minimizing a cost function, that is, minimizing a cancellation error. Different types of filters employ different ways of adapting and determining the filter coefficients, e.g., stochastic approximation as will be further discussed later.

Figure 2:
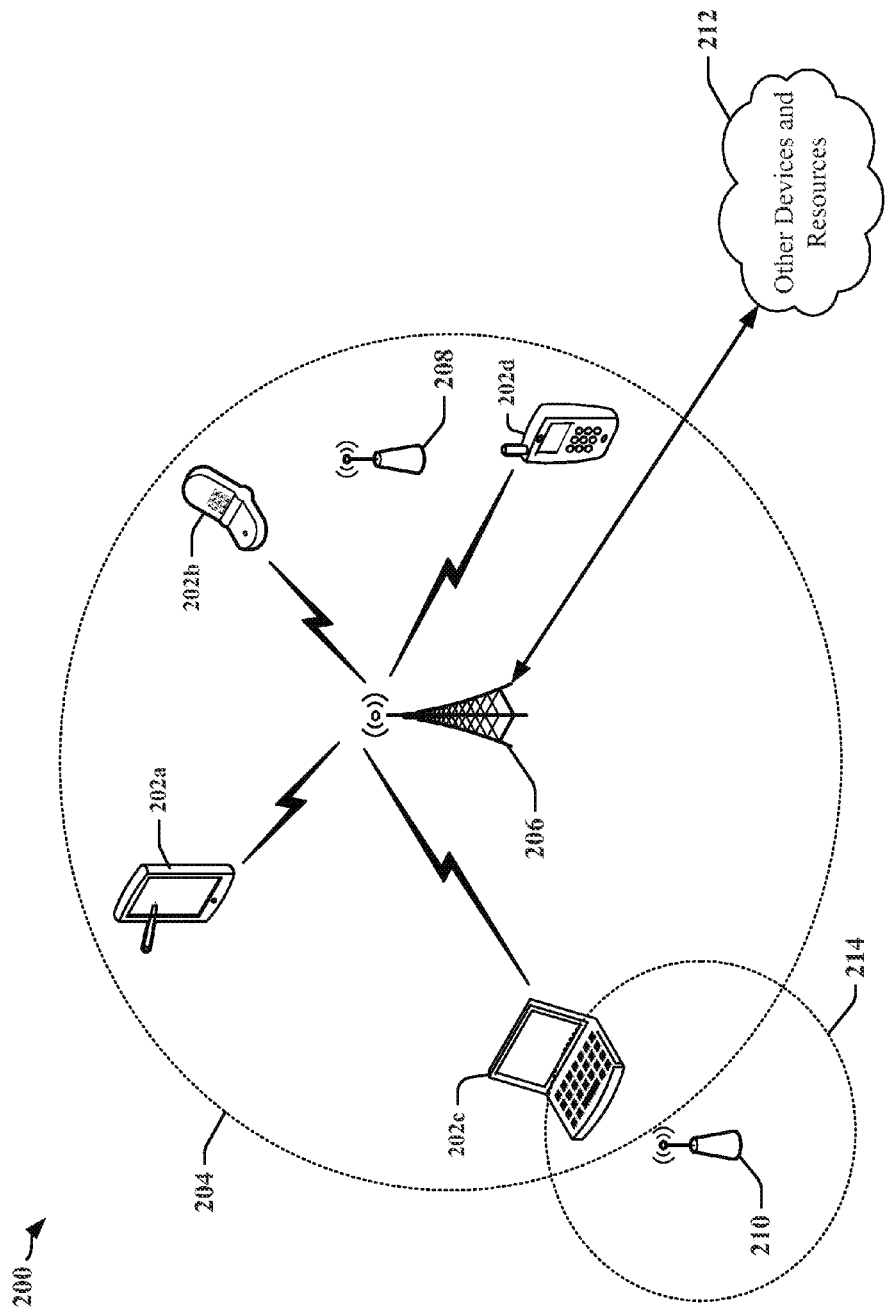
FIG. 2 is a diagram illustrating an exemplary networking environment that includes one or more wireless communication devices.

FIG. 2 is a diagram illustrating an exemplary networking environment 200 that includes one or more wireless communication devices 202a-202d. Each wireless communication device 202a-202d may be adapted or configured to transmit and/or receive wireless signals to/from at least one access point 206, 208, 210. In instances, the wireless communication device 202a-202d may be adapted or configured to transmit and/or receive wireless signals to/from at least one other wireless communication device 202a-202d. The one or more wireless communication devices 202a-202d may include a mobile device and/or a device that, while movable, is primarily intended to remain stationary. In various examples, the device may be a cellular phone, a smart phone, a personal digital assistant, a portable computing device, a wearable computing device, and appliance, a media player, a navigation device, a tablet, etc. The one or more wireless communication devices 202a-202d may also include a stationary device (e.g., a desktop computer, machine-type communication device, etc.) enabled to transmit and/or receive wireless signals. The one or more wireless communication devices 202a-202d may include an apparatus or system embodied in or constructed from one or more integrated circuits, circuit boards, and/or the like that may be operatively enabled for use in another device. Thus, as used herein, the terms "device" and "mobile device" may be used interchangeably as each term is intended to refer to any single device or any combinable group of devices that may transmit and/or receive wireless signals.

One or more of the access points 206, 208, 210 may be associated with a radio access network (RAN) 204, 214 that provides connectivity using a radio access technology (RAT). The RAN 204, 214 may connect the one or more wireless communication devices 202a-202d to a core network. In various examples, the RAN 204, 214 may include a WWAN, a WLAN, a WPAN, a wireless metropolitan area network (WMAN), a Bluetooth communication system, a WiFi communication system, a Global System for Mobile communication (GSM) system, an Evolution Data Only/Evolution Data Optimized (EVDO) communication system, an Ultra Mobile Broadband (UMB) communication system, an LTE communication system, a Mobile Satellite Service-Ancillary Terrestrial Component (MSS-ATC) communication system, and/or the like.

The RAN 204, 214 may be enabled to communicate with and/or otherwise operatively access other devices and/or resources as represented simply by cloud 212. For example, the cloud 212 may include one or more communication devices, systems, networks, or services, and/or one or more computing devices, systems, networks, or services, and/or the like or any combination thereof.

In various examples, the RAN 204, 214 may utilize any suitable multiple access and multiplexing scheme, including but not limited to Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA), etc. In examples where the RAN 204, 214 is a WWAN, the network may implement one or more standardized RATs such as Digital Advanced Mobile Phone System (D-AMPS), IS-95, cdma2000, Global System for Mobile Communications (GSM), UMTS, eUTRA (LTE), or any other suitable RAT. GSM, UMTS, and eUTRA are described in documents from a consortium named "3rd Generation Partnership Project" (3GPP). IS-95 and cdma2000 are described in documents from a consortium named "3rd Generation Partnership Project 2" (3GPP2). 3GPP and 3GPP2 documents are publicly available. In examples where the RAN 204, 214 is a WLAN, the network may be an IEEE 802.11x network, or any other suitable network type. In examples where the RAN 204, 214 is a WPAN, the network may be a Bluetooth network, an IEEE 802.15x, or any other suitable network type.

A wireless communication device 202a-202d may include at least one radio (also referred to as a transceiver). The terms "radio" or "transceiver" as used herein refer to any circuitry and/or the like that may be enabled to receive wireless signals and/or transmit wireless signals. In particular aspects, two or more radios may be enabled to share a portion of circuitry and/or the like (e.g., a processing unit, memory, etc.). That is, the terms "radio" or "transceiver" may be interpreted to include devices that have the capability to both transmit and receive signals, including devices having separate transmitters and receivers, devices having combined circuitry for transmitting and receiving signals, and/or the like.

In some aspects, a wireless communication device 202a-202d may include a first radio enabled to receive and/or transmit wireless signals associated with at least a first network of a RAN 204, 214 and a second radio that is enabled to receive and/or transmit wireless signals associated with an access point 206, 208, 210, a peer device or other transmitter that may geographically overlap or be collocated with the RAN 204, 214, and/or a navigation system (e.g., a satellite positioning system and/or the like).

Figure 3:
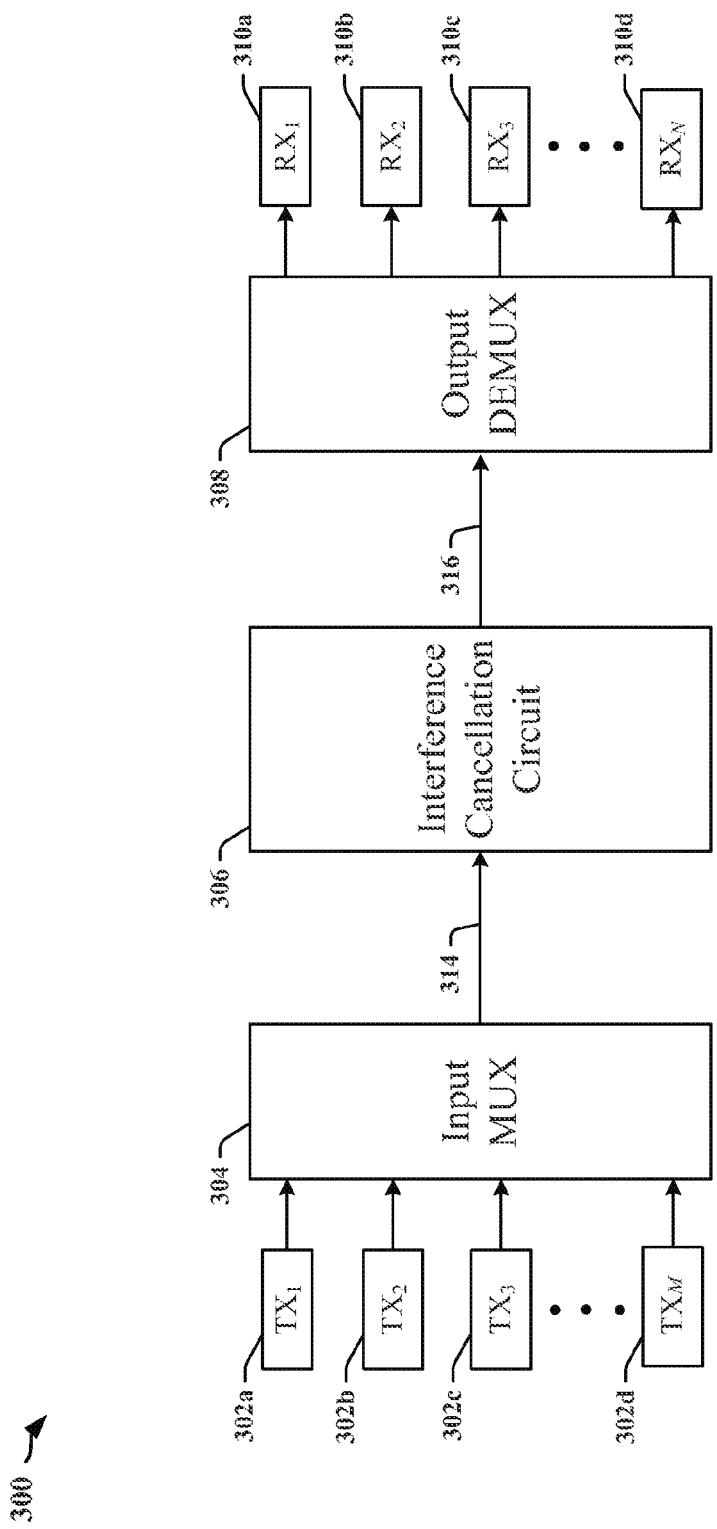
FIG. 3 is a block diagram illustrating an exemplary wireless communication device having plural transmitters and plural receivers, according to various embodiments of the disclosure.

FIG. 3 is a block diagram illustrating an exemplary wireless communication device 300 that includes a plurality of transmitters 302a-302d and a plurality of receivers 310a-310d, in accordance with certain aspects disclosed herein. The transmitters 302a-302d and receivers 310a-310d may be provided as N receiver/transmitter (Rx/Tx) circuits, including a first Rx/Tx circuit 310a/302a, a second Rx/Tx circuit 310b/302b, a third Rx/Tx circuit 310c/302c, and an Nth Rx/Tx circuit 310d/302d. Coexistence issues may occur when one or more transmitters 302a-302d are actively transmitting, and one or more receivers 310a-310d are actively receiving.

Each of the Rx/Tx circuits 310a/302a, 310b/302b, 310c/302c, and/or 310d/302d may be configured to operate according to certain parameters including, for example, a respective frequency, radio frequency circuits with group delays, coupling channel gains to other Tx/Rx circuits Rx/Tx circuits 310a/302a, 310b/302b, 310c/302c, 310d/302d, and/or the like. For instance, the first Tx/Rx circuit 310a/302a may operate at a first frequency $f_1$ with a first delay $d_1$, the second Tx/Rx circuit 310b/302b may operate at a second frequency $f_2$ with a second delay $d_2$, the third Tx/Rx circuit 310c/302c may operate at a third frequency $f_3$ with a third delay $d_3$, and the N-th Tx/Rx circuit 310d/302d may operate at an N-th frequency $f_N$ with an N-th delay $d_N$. The first Tx/Rx circuit 310a/302a may have a coupling channel gain $h_{12}$ to the second Tx/Rx circuit 310b/302b, a coupling channel gain $h_{13}$ to the third Tx/Rx circuit 310c/302c, and a coupling channel gain $h_{1N}$ to the N-th Tx/Rx circuit 310d/302d, respectively. Other Tx/Rx circuits 310a/302a, 310b/302b, 310c/302c, 310d/302d may have different coupling channel gains to various Tx/Rx circuit 310a/302a, 310b/302b, 310c/302c, 310d/302d.

In various aspects, the wireless communication device 300 may be configured to reduce interference produced among Tx/Rx circuits 310a/302a, 310b/302b, 310c/302c, 310d/302d operating, for example, on the same, adjacent, harmonic, or sub-harmonic frequencies. Although the term "interference" is used in the present disclosure, in various examples, other terms, such as but not limited to, "self-interference," "internal inference," and "intra-device interference" may also be applicable.

The wireless communication device 300 may be configured or adapted for different Tx/Rx circuit combinations. That is, the wireless communication device 300 may be configured to cancel interference based on a co-existence issue caused by a current combination of Tx/Rx circuits 310a/302a, 310b/302b, 310c/302c, and/or 310d/302d. For example, a co-existence issue at a time $T_1$ may be caused when the first transmitter 302a is employed for WiFi and the second receiver 310b is employed for Bluetooth. In conventional systems, the apparatus may be configured to selectively provide the output of the first transmitter 302a to an interference cancelling (IC) circuit 306, which may then provide an interference cancellation signal 316 to the second receiver 310b. Accordingly, by utilizing the interference cancellation circuit 306, interference caused by the aggressor Tx/Rx circuit 310a/302a upon the victim Tx/Rx circuit 310b/302b may be reduced. In various examples, the coupling channel gain from the aggressor 310a/302a to the victim Tx/Rx circuit 310b/302b may be −10 dB based on separation of two antennas, and the interference cancellation circuit 306 may be configured to match this gain for successful interference cancellation. In operation aspects, the wireless communication device 300 may include a multiplexer (MUX) circuit 304 and a demultiplexer (DEMUX) circuit 308 that may be controlled to select an interference cancellation configuration. In various examples where the wireless communication device 300 includes one transmitter and one receiver, the multiplexer and demultiplexer are not required.

In certain wireless communication systems, transmit interference may degrade the performance of a nearby (local) receiver. To mitigate this problem, interference cancellation may be used to minimize transmit interference in the receiver. Interference cancellation may in some examples be performed by adaptively estimating coefficients in an analog interference cancellation (AIC) circuit. Blind coefficient computation for AIC circuits may be preferred in some cases due to its simpler implementation. However, in some cases, when the desired receive signal energy is relatively high (comparable to the transmit interference), the determination of improved AIC circuit coefficients may be distorted due to the presence of the strong desired receive signal. This is because there is a weak correlation between the reference signal for interference cancellation (from the AIC circuit) and the total receive signal. (Total receive signal includes the desired receive signal plus transmit interference.) That is, the receiver may receive a superposition of both interference and the desired receive signal, which may prevent a clean measurement of the interference signal if the power of the desired receive signal is high, relative to the interference. A "clean" measurement of the interference signal may be defined as having minimal or no presence of desired receive signal (e.g., having minimal or no assigned traffic and/or pilot signals) while measuring the interference signal. As a consequence, a cost function of the coefficients may not follow a quadratic characteristic, which is a characteristic to facilitate coefficient refinement (i.e., improvement). Thus, disclosed herein is an interference cancellation technique, which aspects disclosed herein. The transmitter (TX) 402 may be an offending transmitter and the receiver 420 may be a victim receiver. That is, the transmitter 402 may be an offender that generates or causes local interference in connection with over-the-air interference signal 406 received by the victim receiver 420. In various examples, the offending transmitter 402 and the victim receiver 420 may be part of the same device. In other examples, the offending transmitter 402 and the victim receiver 420 are part of separate devices. Moreover, while a single transmitter 402 and a single receiver 420 are shown, more than one transmitter 402 and/or more than one receiver 420 may be provided in accordance with aspects of the disclosure. In various aspects, the transmitter 402 is one of the transmitters 302 shown in FIG. 3 and the receiver 420 is one of the receivers 310 shown in FIG. 3.

The transmitter 402 may be associated with, or coupled to, a power amplifier (PA) 408 and a TX filter 410, which components are well-known in the art and so a further description is omitted for the sake of brevity. The PA 408 may receive a signal or data from a data source 401 for transmission by the TX 402.

The transmitter 402 may be associated with a coupler 412. The coupler 412 may be used to provide a reference signal r(t) 404 (through a filter 414) to an AIC circuit 416. The filter 414 is a replica of filter 424 to match the delay in the over-the-air path 406 and reference path from the coupler at the transmitter to the adder or coupler at the receiver. In various examples, the filter 414 may be a bandpass filter (BPF). In this respect, the path from the coupler 412, through the filter 414, to the AIC circuit 416 may serve as a reference path in order to provide the reference signal r(t). The AIC circuit 416 may include interference canceller (IC) 418 to adaptively modify the frequency response of the reference signal r(t) 404 to match the undesired transmit interference. In various examples, the interference canceller 418 is an adaptive filter, for example, a least mean square (LMS) adaptive filter. The reference signal r(t) 404 may correspond to some portion or function of the signal transmitted by the transmitter 402, and may be provided through a filter 414. In various examples, the AIC circuit 416 may include a one-tap adaptive filter, for example, to filter the reference signal r(t) 404.

Broadly, the AIC circuit 416 may be configured to generate an output signal that matches the over-the-air interference signal 406 as closely as possible, such that the AIC output can be combined with the over-the-air interference signal 406 in a destructive fashion to cancel the local interference to the receiver 420. The local interference may be the undesired transmit interference coming from the transmitter; that is, the over-the-air interference signal 406. The AIC 416 may include a switch operation (SO) 419. The switch operation 419 may selectively direct the filtered reference signal 405 from the AIC circuit 416 to receiver 420.

The AIC circuit 416 may be configured to generate an output that can be supplied as an input to an adder 422 of receiver (RX) 420. Although component 422 is depicted as an adder in FIG. 4, one skilled in the art would understand that the component 422 may be a subtractor, a combiner, an integrator or another component that subtracts, combines or adds signals. In some instances, the over-the-air interference signal 406 may be provided to the adder 422 through a filter 424. In various examples, the filter 424 may be a bandpass filter (BPF). The adder 422 may be configured to combine its inputs in order to generate an output that is provided to a low-noise amplifier (LNA) 426.

In various examples, the adder 422 may be configured to subtract the input provided by the AIC circuit 416 from the input received from the filter 424. In an ideal case where selection of filter coefficients is perfect, the signal provided at the input of the adder 422 is equal to the interference associated with the over-the-air interference signal 406, such that the interference is removed in the signal provided to the LNA 426.

The system 400 may provide for the filter 414 in the reference signal path and the filter 424 coupled to the receiver antenna to have the same filter characteristics within a specified tolerance. That is, filtering both signals in the same way can help ensure that any timing mismatch between the reference signal r(t) and the over-the-air interference signal 406 (i.e., a received signal to the receiver) is reduced or eliminated.

In some instances, the AIC circuit 416 may be configured using information that is based on the over-the-air interference signal 406 after it is converted into a baseband signal. In various examples, a coefficient controller 450 may derive one or more coefficients from a baseband signal and configure the AIC circuit 416 based on the coefficients. That is, the output y(t) from the LNA 426 may be provided to a mixer 428 and to the AIC circuit 416. The mixer 428 then converts the output y(t) from the LNA 426 from a first signal domain or frequency to a second signal domain or frequency. For example, the first signal domain may relate to a selected radio frequency and the second signal domain may relate to baseband frequencies. Here, a baseband signal may include an unmodulated signal, a lowpass signal, or a signal at relatively low frequencies, in some examples corresponding to an audible range up to 20 kHz, for example. In some instances, the mixer 428 may receive a signal from an oscillator such as a voltage-controlled oscillator (VCO), not shown, in order to provide the conversion to baseband. The output baseband signal from the mixer 428 may be provided to an analog filter 430 that may operate as an anti-aliasing filter.

The output of the analog filter 430 may be provided to an analog-to-digital converter (ADC) 432 shown to reside within the coefficient controller 450. The output of the ADC 432 may optionally be provided to a digital filter 434. The output of the digital filter 434 may be provided to a processor 436. In some instances, the digital filter 434 may be omitted such that the processor 436 may compute the digital coefficients directly from digital samples of the baseband signal output from the ADC 432.

The processor 436 may be configured to generate and output one or more signals representative of DC offset, and/or adaptive filter coefficients to the AIC circuit 416. The processor 436 may produce an output in a digital format, and the output may be provided to a digital-to-analog converter (DAC) 440. The output of the DAC 440 may then be provided to the AIC 416 and/or the interference canceller 418. In various examples, the coefficient controller 450 may be used to obtain a set of coefficients (e.g., based on the measurement of the interference within the guard region).

It should be understood that the components described herein are not exclusive and that other components may be included or some of the components described may be excluded without violating the scope and spirit of the disclosure.

In various examples, the presence of a desired receive signal (e.g., assigned traffic and/or pilots) may prevent a clean measurement of an interference signal. By measuring the interference signal in the guard band, coefficients for the AIC circuit (e.g., AIC circuit 416) may be obtained for interference cancellation.

Interference cancellation circuits provided according to certain aspects disclosed herein can be adapted to simultaneously handle multiple interference sources and/or types that may affect a receiver. An aggressor transmitter may operate at any frequency and a victim receiver may operate at any frequency. For example, an aggressor transmitter may operate within any frequency in a wireless wide area network (WWAN) protocol and a victim receiver may operate in any frequency in a wireless local area network (WLAN) protocol. In various examples, LTE and WiFi systems may operate in any of a number of different bands or frequencies. WiFi is a local area wireless technology operating in the 2.4 GHz and 5 GHz radio band. "WiFi" is a trademark of the Wi-Fi Alliance. The Wi-Fi Alliance defines Wi-Fi as any wireless local area network (WLAN) product based on the Institute of Electrical and Electronics Engineers' (IEEE) 802.11 standards. For example, the WiFi band may include frequencies referred to in IEEE 802.11 protocols, such as, 2.4 GHz and 5 GHz. And, the LTE band may include bands 7, 40, and 41. In some particular combinations, where LTE and WiFi systems operate in nearby or overlapping frequencies, etc., one may interfere with the other. For example, a source of interference may be a nearby and/or local transmit antenna that transmits LTE signals in frequencies allocated to LTE. These LTE signals may produce strong interference at a Wi-Fi receive antenna. Different types of interference may be produced, including interference caused by out-of-band (OOB) emission, fundamental emission, and phase noise. Interference may be produced when the frequencies used by the Wi-Fi channel are nearby or are far from the frequencies used by LTE. In one specific example, interference may occur between the 2.462 GHz Wi-Fi Channel 11 and LTE transmissions in LTE band 40 (B40), which is allocated frequencies between 2.3 GHz and 2.4 GHz with a bandwidth of 100 MHz. Interference may occur because the channelization filter, which may be an analog anti-aliasing filter, is placed after a mixer, and an excessive amount of energy falls into the Wi-Fi band and saturates the RX front end. Although the examples described herein may be based on LTE signals, other wireless signal types are equally applicable to the examples herein and are intended to be covered by the disclosure.

In a wireless system, a receiver may be adversely affected by interference from a nearby transmitter. An interference cancellation technique may include determining coefficients for an AIC filter by measuring a received interference signal and adapting filter coefficients (e.g., AIC filter coefficients) to minimize the interference. The interference cancellation technique may rely on a clean measurement of the interference signal. And, if the desired receive signal has a strong level compared to the interference signal measurement (e.g., the signal energy may be large compared the interference energy), the interference signal measurement may be compromised. In various examples, a scenario may occur when the desired receive signal is a WiFi signal (for a wireless local area network) and the interference is from an LTE signal (for a wireless wide area network).

Guard regions (e.g., guard bands or guard tones) are regions in the frequency domain that are unused for traffic and pilots at all times since they are reserved a priori to be without assigned traffic or pilots. Guard regions differ from idle regions, since idle regions include assigned traffic and/or pilots that may not be active at all times. In various examples, a measurement of the interference signal in a wireless receiver may be obtained by measuring the interference in a guard region that is associated with a desired receive signal. The guard region, by design, contains negligible energy from the desired receive signal; that is, the level of the desired receive signal in the guard region is negligible. In various aspects, the guard region may be a guard tone, for example, for an OFDM system, or the guard region may be a guard band, for example, between two spectrally adjacent wireless systems. Thus, the measurement of the interference signal obtained within the guard tone or the guard band may yield more accurate coefficients (e.g., AIC coefficients) for interference cancellation. Various examples may be used, for example, where the interference signal is an LTE B40 signal, which has a 2 MHz guard band against an adjacent WiFi (channel 1) OFDM signal.

In addition, the WiFi OFDM signal may include 64 tones, of which 6 tones are designated as guard tones on the lower side of the OFDM signal spectrum (i.e., with lower frequencies) and 6 tones are designated as guard tones on the upper side of the OFDM signal spectrum (i.e., with higher frequencies). In various examples, the AIC filter coefficients may be updated when a pair of threshold conditions are met: that is, when the desired receive signal level is less than a first threshold (i.e., the desired receive signal is regarded as low) and the interference signal level is greater than a second threshold (i.e., the interference signal is regarded as high).

In various examples, the desired receive signal level is a signal power level. In other various examples, the desired receive signal level is a signal energy level. In yet other various examples, the desired receive signal level is a signal voltage level. One skilled in the art would understand that the choice of whether the desired receive signal level is a signal power level, a signal energy level or a signal voltage level is an implementation choice. In various examples, the interference signal level is a signal power level. In other various examples, the interference signal level is a signal energy level. In yet other various examples, the interference signal level is a signal voltage level. One skilled in the art would understand that the choice of whether the interference signal level is a signal power level, a signal energy level or a signal voltage level is an implementation choice. Additionally, other types of signal levels may be used in accordance with a specific implementation.

The AIC filter coefficients may be determined by an algorithm, e.g., sign stochastic approximation (SSA), from successive measurements of the interference signals applied to the interference cancellation system. The sign stochastic approximation may also be referred to as sign stochastic approximation.

Figure 5:
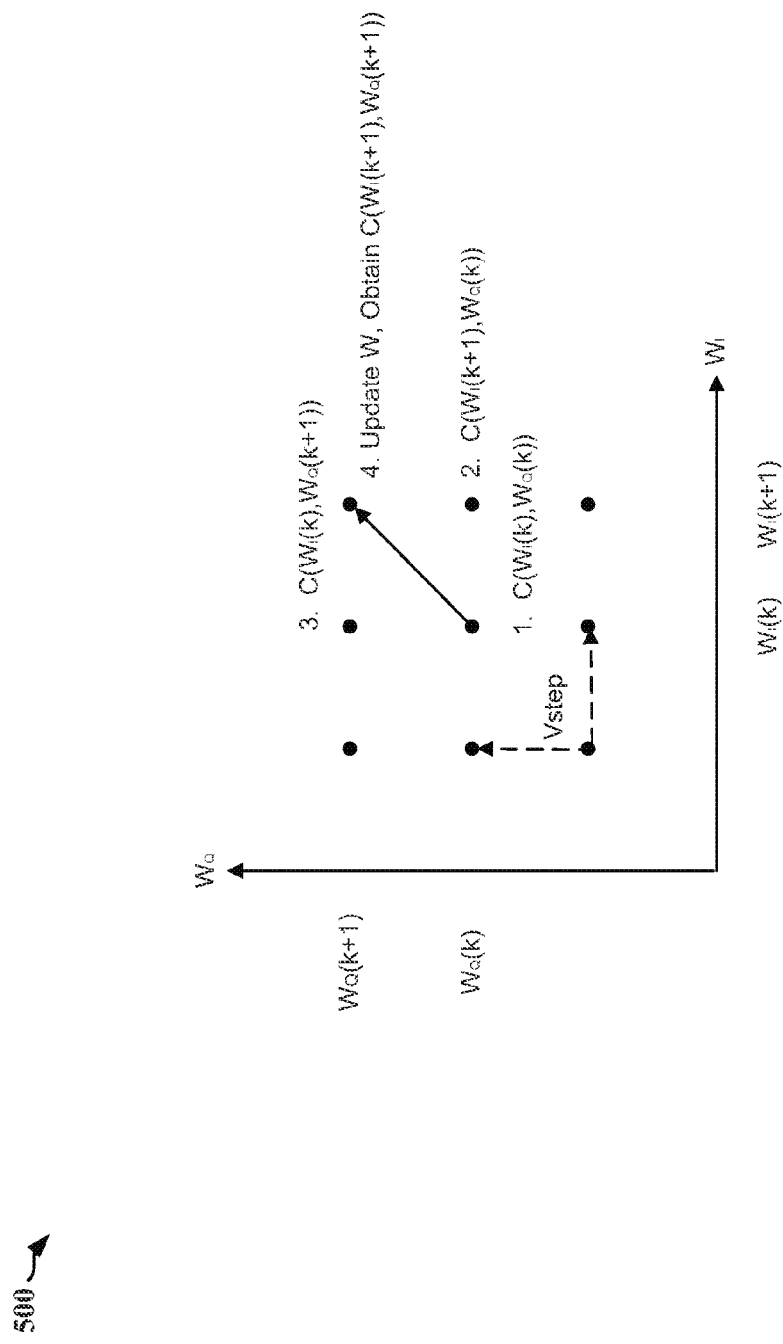
FIG. 5 is a graph for displaying an exemplary in-phase active interference cancellation (AIC) coefficient component versus quadrature AIC coefficient component.

FIG. 5 is a graph 500 for displaying an exemplary in-phase active interference cancellation (AIC) coefficient component and quadrature AIC coefficient component. As illustrated in FIG. 5, the AIC coefficient is represented as a complex coefficient in a rectangular coordinate system, namely, an in-phase AIC coefficient $W_I$ along the x-axis and a quadrature AIC coefficient $W_Q$ along the y-axis. Also shown are the respective orthogonal coefficients for two successive samples, namely $W_I(k)$ and $W_I(k+1)$ for the in-phase component, and $W_Q(k)$ and $W_Q(k+1)$ for the quadrature component, where k is a sample index for the kth sample and (k+1) is a sample index for the (k+1)th sample.

For example, the sign stochastic approximation (SSA) technique for AIC coefficient estimation may be implemented with a four step approach using a normalized step size, $V_{step}$, where the desired AIC coefficient may be found from successive interference power measurements, as illustrated in FIG. 5. In step 1 (designated as "1" in FIG. 5), start with an initial pair of orthogonal coefficients $W_I(k)$, $W_Q(k)$ and compute an initial cost function $C(W_I(k), W_Q(k))$ corresponding to the initial complex coefficient. In various examples, the initial coefficient may be default values set by the system design and may be an implementation choice. Additionally, one skilled in the art would understand that any suitable value may be used within the scope and spirit of the present disclosure. A cost function is used to select refined (i.e., improved) coefficients for the AIC circuit. Typically, the cost function is a mathematical function of its input. In various examples, the cost function is a quadratic function. The cost function may represent the mean square error (MSE) of the selected coefficients if the cost function is a quadratic function. For example, the cost function may be a received signal strength indication (RSSI) of the measurement of an interference signal within a guard region when there is minimal or no presence of the desired receive signal.

In step 2 (designated as "2" in FIG. 5), obtain a first two-dimensional (2-D) coefficient-via-in-phase-increment $W_I(k+1)$, $W_Q(k)$ and compute an incremental in-phase cost function $C(W_I(k+1), W_Q(k))$ corresponding to the first 2-D coefficient-via-in-phase-increment. In step 3 (designated as "3" in FIG. 5), obtain a first 2-D coefficient-via-quadrature-increment $W_I(k)$, $W_Q(k+1)$ and compute an incremental quadrature cost function $C(W_I(k), W_Q(k+1))$ corresponding to the first 2-D coefficient-via-quadrature-increment. In step 4 (designated as "4" in FIG. 5), obtain an updated coefficient $W_I'(k+1)$, $W_Q'(k+1)$ using the sign stochastic approximation based on the initial pair of complex coefficient $W_I(k)$, $W_Q(k)$; the first 2-D coefficient-via-in-phase-increment $W_I(k+1)$, $W_Q(k)$; the first 2-D coefficient-via-quadrature-increment $W_I(k)$, $W_Q(k+1)$ and their respective cost functions: $C(W_I(k), W_Q(k))$, $C(W_I(k+1), W_Q(k))$ and $C(W_I(k), W_Q(k+1))$. If the incremental in-phase cost function $C(W_I(k+1), W_Q(k))$ is not greater than the initial coefficient $C(W_I(k), W_Q(k))$, the in-phase cost function $W_I(k+1)$ may be set to $W_I(k)+V_{step}$. Otherwise, $W_I(k+1)$ may be set to $W_I(k)-V_{step}$. Likewise, if the incremental quadrature cost function $C(W_I(k), W_Q(k+1))$ is not greater than the initial coefficient $C(W_I(k), W_Q(k))$, the quadrature cost function $W_Q(k+1)$ may be set to $W_Q(k)+V_{step}$. Otherwise, $W_Q(k+1)$ may be set to $W_Q(k)-V_{step}$. Step 4 is the state to update the coefficients $W_I(k+1)$ and $W_Q(k+1)$ with updated values and to obtain the corresponding cost function. After step 4, move on to step 1 and repeat the process until stop conditions are met. Stop conditions are conditions that determine there will be no further iteration (i.e., no more repeating of the process in steps 1-4).

In various examples, the order of step 2 and step 3 may be swapped. That is, step 3 may be performed before performing step 2. In this new order, in step 2 obtain a first two-dimensional (2-D) coefficient-via-quadrature-increment $W_I(k)$, $W_Q(k+1)$ and compute an incremental quadrature cost function $C(W_I(k), W_Q(k+1))$ corresponding to the first 2-D coefficient-via-quadrature-increment. In this new order, in step 3 obtain a first two-dimensional (2-D) coefficient-via-in-phase-increment $W_I(k+1)$, $W_Q(k)$ and compute an incremental in-phase cost function $C(W_I(k+1), W_Q(k))$ corresponding to the first 2-D coefficient-via-in-phase-increment. The coefficient update may be done as separate in-phase and quadrature updates. Next, in step 4, an updated coefficient may be applied to the existing coefficient and the cost function may also be updated. Following step 4, continue to step 1 and repeat the process until stop conditions are met.

Figure 6A:
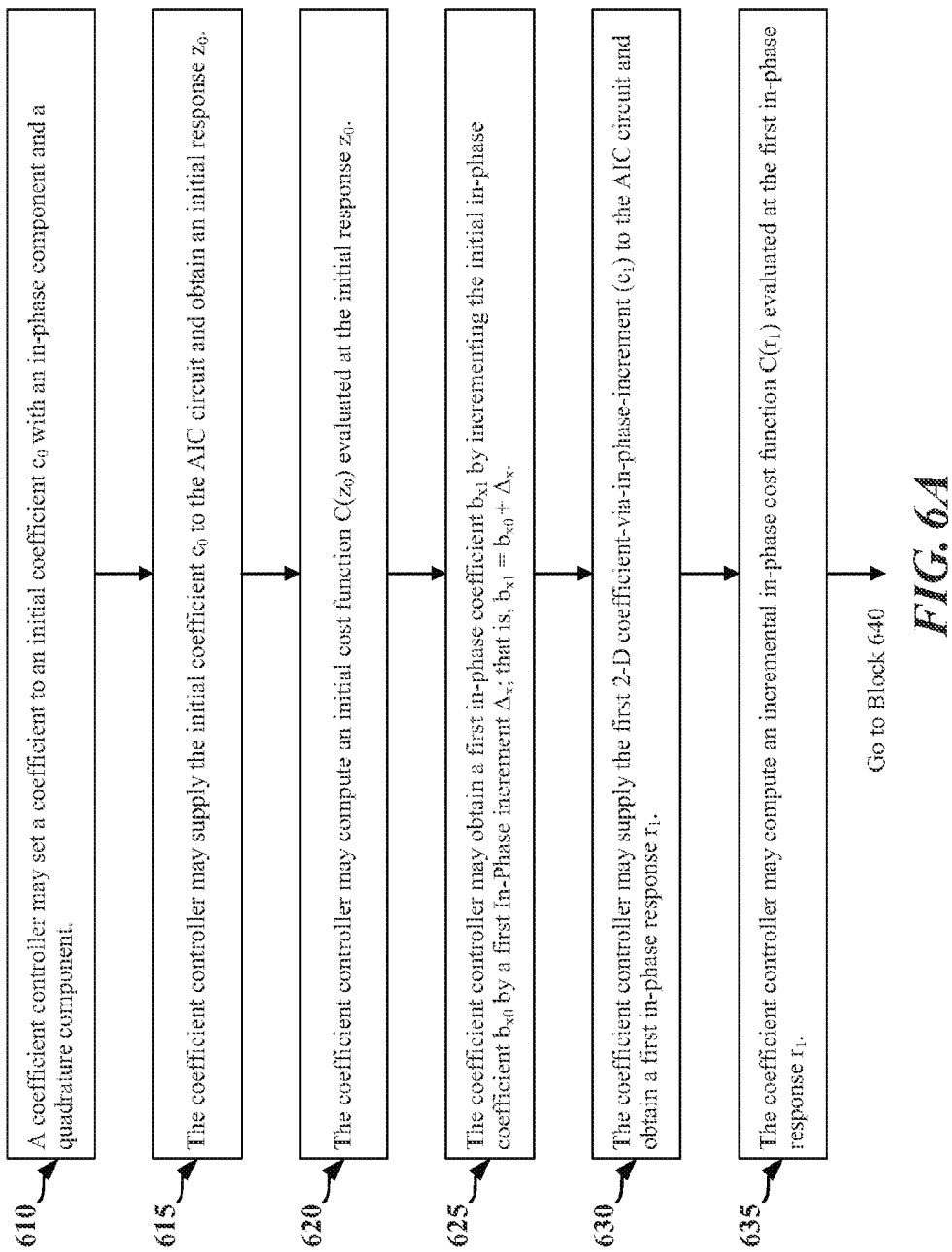
FIGS. 6A, 6B and 6C, in three respective sequential parts, illustrate a flow diagram of an exemplary algorithm for utilizing a sign stochastic approximation to determine coefficients for interference cancellation in a receiver.
Figure 6B:
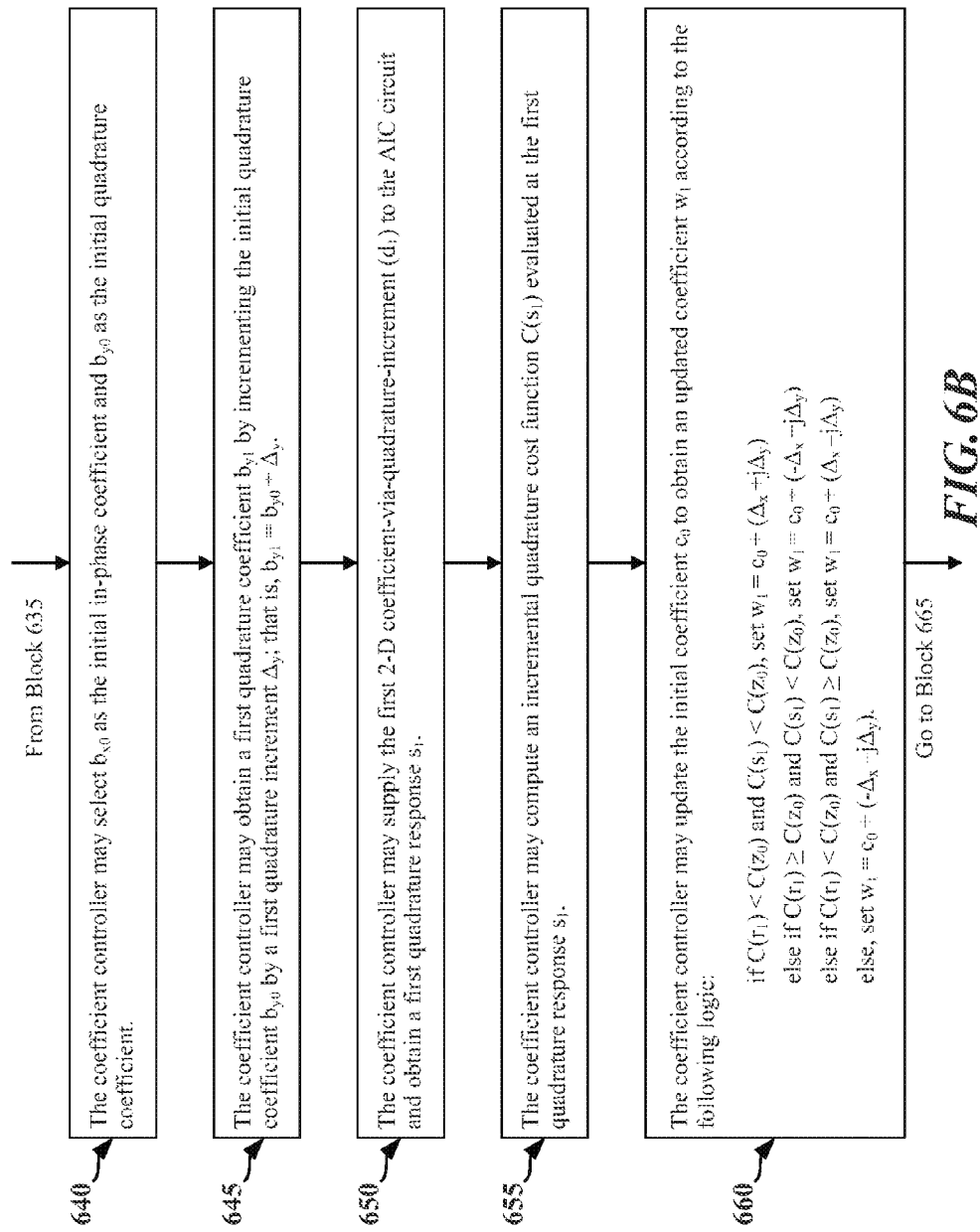
Figure 6C:
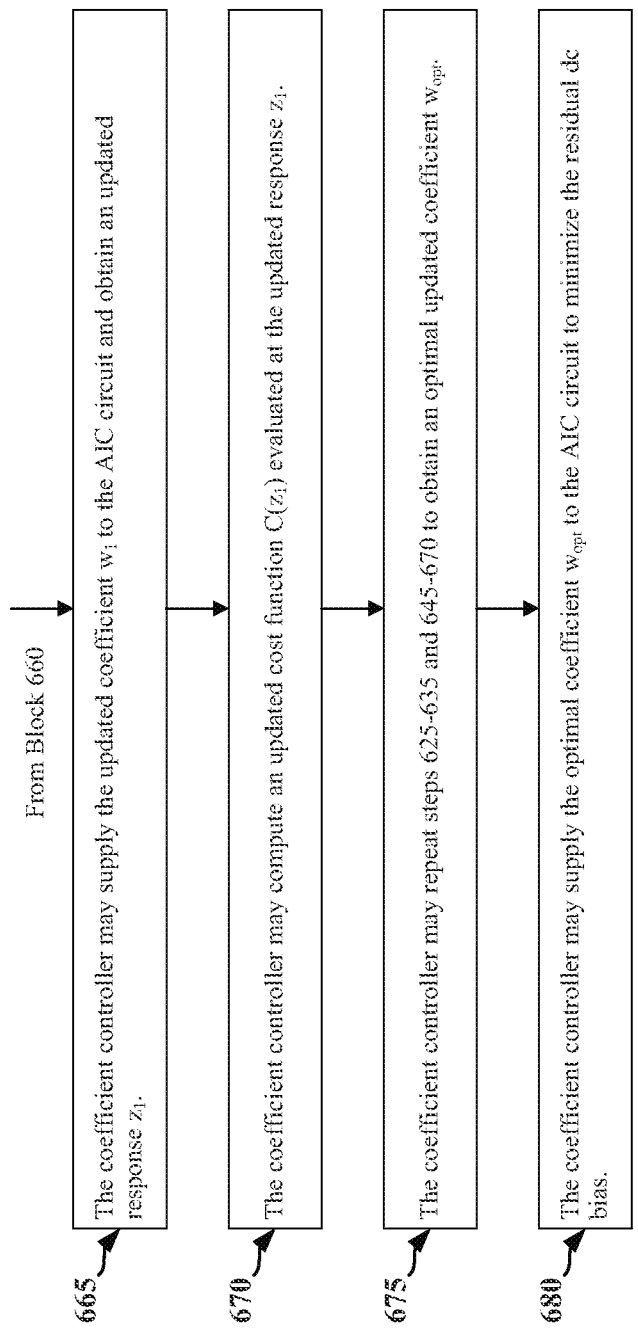

FIGS. 6A, 6B and 6C, in three respective sequential parts, illustrate a flow diagram of an exemplary algorithm for utilizing a sign stochastic approximation to determine coefficients for interference cancellation in a receiver, according to some aspects of the disclosure. In various aspects, a coefficient computation algorithm may use a first digital signal component x(n) and a second digital signal component y(n) as inputs. The coefficient computation algorithm utilizing the sign stochastic approximation produces a first baseband coefficient $b_x$ and a second baseband coefficient $b_y$ as outputs. The first digital signal component x(n) is referred to as an in-phase signal component and the second digital signal component y(n) is referred to as a quadrature signal component. Correspondingly, the first baseband coefficient $b_x$ is referred to as an in-phase component and the second baseband coefficient $b_y$ is referred to as a quadrature component.

Compute Initial Cost Function $C(z_0)$

In block 610, a coefficient controller 450 may set a coefficient to an initial coefficient $c_0$ with an in-phase component and a quadrature component. The initial coefficient $c_0$ may be represented as $(b_{x0}, b_{y0})$, where $b_{x0}$ is the initial in-phase component and $b_{y0}$ is the initial quadrature component. Although the example is presented with in-phase and quadrature components, it may be generalized to any two dimensions, i.e., to a first dimension and a second dimension. In block 615, the coefficient controller 450 may supply the initial coefficient $c_0$ to the AIC circuit 416 and obtain an initial response $z_0$. In block 620, the coefficient controller 450 may compute an initial cost function $C(z_0)$ evaluated at the initial response $z_0$. The initial cost function $C(z_0)$ corresponds to the initial coefficient $c_0$.

Fix the Quadrature Component and Increment the in-Phase Component Utilizing Sign Stochastic Approximation In block 625, the coefficient controller 450 may fix the quadrature component and increment the in-phase component utilizing a sign stochastic approximation. For example, in block 625, the coefficient controller 450 may obtain a first in-phase component $b_{x1}$ by incrementing the initial in-phase component $b_{x0}$ by a first in-phase increment $\Delta_x$; that is, $b_{x1}=b_{x0}+\Delta$. Thus, a first 2-D coefficient-via-in-phase-increment ($c_1$) is represented as $(b_{x1}, b_{y0})$. In block 630, the coefficient controller 450 may supply the first 2-D coefficient-via-in-phase-increment ($c_1$) to the AIC circuit 416 and obtain a first in-phase response $r_1$. In block 635, the coefficient controller 450 may compute an incremental in-phase cost function $C(r_1)$ evaluated at the first in-phase response $r_1$. In various examples, the first in-phase response $r_1$ may be obtained either as a sample average or as a moving average. The incremental in-phase cost function $C(r_1)$ corresponds to the first 2-D coefficient-via-in-phase-increment $(c_1)$. The first in-phase increment $\Delta_x$ may be either a positive or a negative value. In various examples, the value of the first in-phase increment $\Delta_x$ may be affected by an implementation choice and the value may thus be set accordingly. Additionally, one skilled in the art would understand that any suitable value may be used within the scope and spirit of the present disclosure.

Fix the in-Phase Component and Increment the Quadrature Component Utilizing Sign Stochastic Approximation In block 640, the coefficient controller 450 may fix the in-phase component and increment the quadrature component utilizing the sign stochastic approximation. For example, in block 640, the coefficient controller 450 may select $b_{x0}$ as the initial in-phase component and $b_{y0}$ as the initial quadrature component. In block 645, the coefficient controller 450 may obtain a first quadrature component $b_{y1}$ by incrementing the initial quadrature component $b_{y0}$ by a first quadrature increment $\Delta_y$; that is, $b_{y1}=b_{y0}+\Delta_y$. Thus, a first 2-D coefficient-via-quadrature-increment $(d_1)$ is represented as $(b_{x0}, b_{y1})$. In block 650, the coefficient controller 450 may supply the first 2-D coefficient-via-quadrature-increment $(d_1)$ to the AIC circuit 416 and obtain a first quadrature response $s_1$. In block 655, the coefficient controller 450 may compute an incremental quadrature cost function $C(s_1)$ evaluated at the first quadrature response $s_1$. In various examples, the first quadrature response $s_1$ is obtained either as a sample average or as a moving average. The incremental quadrature cost function $C(s_1)$ corresponds to the first 2-D coefficient-via-quadrature-increment $(d_1)$. The first quadrature increment $\Delta_y$ may be either a positive or a negative value. In various examples, the value of the first quadrature increment $\Delta_y$ may be affected by an implementation choice and the value may thus be set accordingly.

Updating the Coefficients

In block 660, the coefficient controller 450 may update the initial coefficient $c_o$ to obtain an updated coefficient $w_1$ according to the following logic:
 a) if $C(r_1)<C(z_0)$ and $C(s_1)<C(z_0)$, set $w_1=c_0+(\Delta_x+j\Delta_y)$; or
 b) else if $C(r_1)\geq C(z_0)$ and $C(s_1)<C(z_0)$, set $w_1=c_0+(-\Delta_x+j\Delta_y)$; or
 c) else if $C(r_1)<C(z_0)$ and $C(s_1)\geq C(z_o)$, set $w_1=c_0+(\Delta_x-j\Delta_y)$; or
 d) else, set $w_1=c_0+(-\Delta_x-j\Delta_y)$.

That is, how the initial coefficient $c_0$ is updated to $w_1$ is based on which one of the four conditions (a, b, c or d) is true.

In block 665, the coefficient controller 450 may supply the updated coefficient $w_1$ to the AIC circuit 416 and obtain an updated response $z_1$. In block 670, the coefficient controller 450 may compute an updated cost function $C(z_1)$ evaluated at the updated response $z_1$. In various examples, the updated response $z_1$ is obtained either as a sample average or as a moving average. The updated cost function $C(z_1)$ corresponds to the updated coefficient $w_1$.

In block 675, the coefficient controller 450 may repeat blocks 625-635 and 645-670 to obtain an improved updated coefficient $w_{opt}$. The improved updated coefficient $w_{opt}$ corresponds to an improved cost function, where the improved cost function is a cost function that is less than a cost function threshold $C_{threshold}$. One would understand that values of the cost function threshold $C_{threshold}$ may depend on one or more of the following: analog to digital converter (ADC 432) quantization level, thermal noise at ADC 432, interference at ADC 432, the presence of the desired signal, etc.

In block 680, the coefficient controller 450 may supply the improved coefficient $w_{opt}$ to the AIC circuit to perform interference cancellation. Additionally, the components described in FIGS. 4 and/or 9 may be implemented to perform some or all the blocks of the flow diagram in FIG. 6. For example, the steps in the blocks of the flow diagram in FIG. 6 may be performed by the coefficient controller 450 shown in FIG. 4, or more specifically, by the processor 436 that resides within the coefficient controller 450. In various examples, a processing circuit or a processor, such as those described in FIG. 9 may be used to perform any of the steps in the blocks of the flow diagram in FIG. 6.

The sign stochastic approximation (SSA) technique for AIC coefficient estimation may be implemented as shown in FIG. 6 where the desired AIC coefficient may be found from successive measurements of the interference signal. In various examples, measurement of the interference signal may be performed in a guard region. For example, in an Orthogonal Frequency Division Multiplex (OFDM) system (e.g., WiFi, 802.11n), there may be a total of N subcarriers in an allocated spectrum B (e.g., N=64 and B=20 MHz in WiFi). Here, the subcarrier frequency spacing is $\Delta f=B/N$ (e.g., 20 MHz/64=0.3125 MHz for WiFi), assuming uniform spacing of the subcarriers. Although uniform spacing of the subcarriers is used in the examples herein, one skilled in the art would understand that non-uniform spacing of the subcarriers may also be used and be within the scope and spirit of the present disclosure.

In various examples, the N subcarriers may be synthesized at a transmitter using an inverse fast Fourier transform (IFFT) process with N samples. The N samples may include time domain samples and/or frequency domain samples. A quantity M of the N subcarriers may be assigned to traffic and pilots and the remainder (N−M) of the N subcarriers may be reserved as a guard region (e.g., guard tones). For example, in WiFi, M=52 subcarriers are assigned to traffic and pilots and (N−M)=12 subcarriers are reserved as a guard region (e.g., guard tones). In this case, 6 guard tones may be placed at a lower end of the allocated spectrum B (i.e., at the lower frequencies) and 6 guard tones may be placed at the upper end of the allocated spectrum B (i.e., at the higher frequencies). The guard regions (e.g., guard band or guard tones) may be unused for traffic and pilots at all times since they are reserved a priori to be without assigned traffic or pilots. This feature enables a clean measurement of the interference within the guard region, without the presence of assigned traffic or pilots.

The guard region, by design, contains negligible energy from the desired signal, i.e., from the traffic and pilots as part of the M assigned subcarriers. M is the quantity of assigned subcarriers. The guard region may include ambient noise (e.g. thermal noise, both internal and external) at a low level, which enables a clean measurement of the interference signal that is the dominant contributor to the total receive energy in the guard region. Although it is noted that other undesired sources, such as random emissions or Bluetooth emissions, for example, may also appear intermittently in the guard region, criteria well known in the art may be used to reject interference measurements that may be contaminated by these other undesired sources. Hence, a clean measurement of the interference signal in the guard region is attainable for use in interference cancellation.

Figure 7:
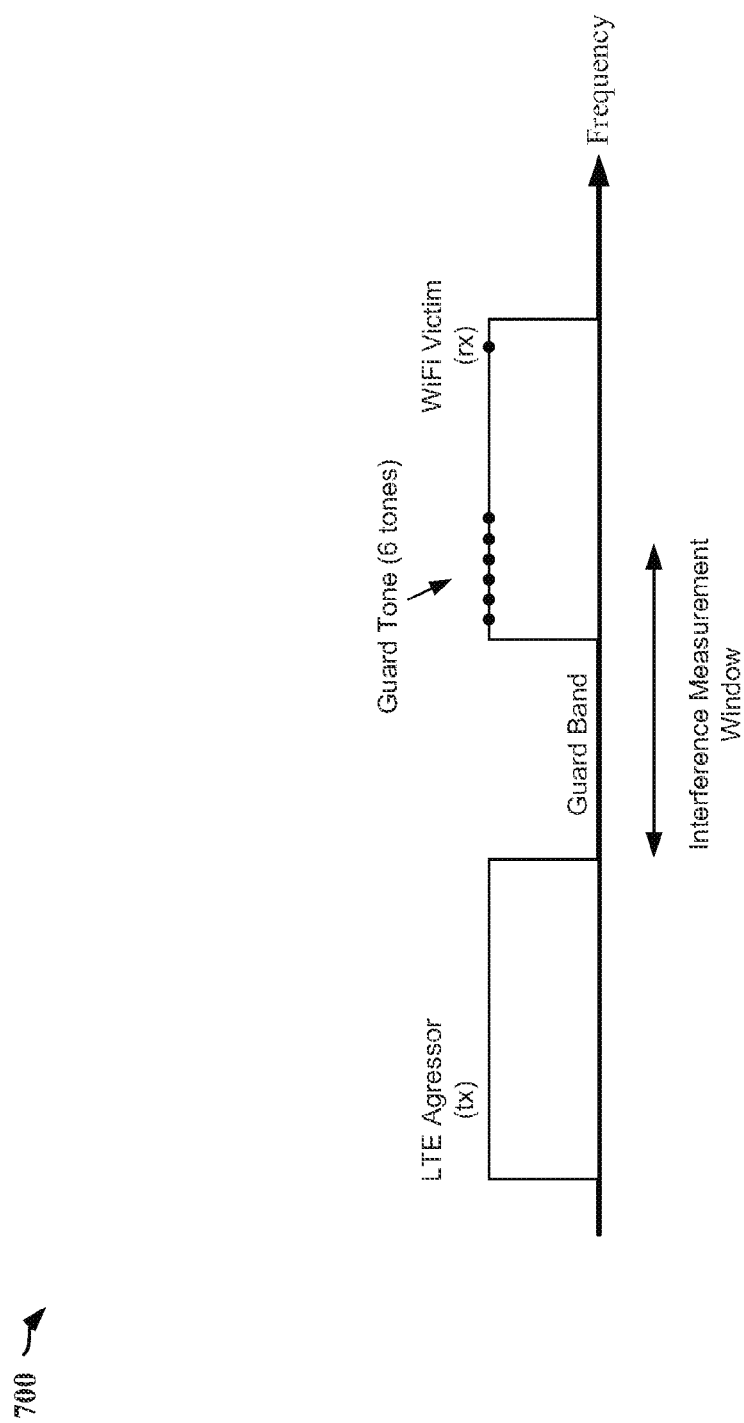
FIG. 7 is a graph illustrating an exemplary spectral region, which includes a LTE transmit band and a WiFi receive band.

In addition, the guard region may be a guard band between adjacent radio bands, for example, between a transmit band from an aggressor transmitter and a receive band from a victim receiver. For example, in the 2.4 GHz WiFi band, there is a guard band with 2 MHz bandwidth between LTE band B40 and WiFi channel 1, which may be used to obtain a measure of the interference signal. FIG. 7 is a graph 700 illustrating an exemplary spectral region, which includes a LTE band (i.e., a transmit band) and a WiFi band (i.e., a receive band). FIG. 7 depicts a frequency axis with a guard band between an LTE band being used by an aggressor transmitter and a WiFi band being used by a victim receiver. An interference measurement window is a spectral region for measuring an interference signal. An interference measurement window as a function of frequency is shown in FIG. 7, which includes the guard band and a plurality of guard tones. The guard band has a bandwidth of 2 MHz. Within the WiFi band there are 6 guard tones on the lower end of the allocated spectrum (i.e., in the lower frequencies) that span 1.875 MHz. Thus, a total of 3.875 MHz bandwidth (the guard band of 2 MHz plus the 6 guard tones of 1.875 MHz) may be available for measuring an interference signal. That is, the interference measurement window, as illustrated in FIG. 7, has a total bandwidth of 3.875 MHz.

Figure 8:
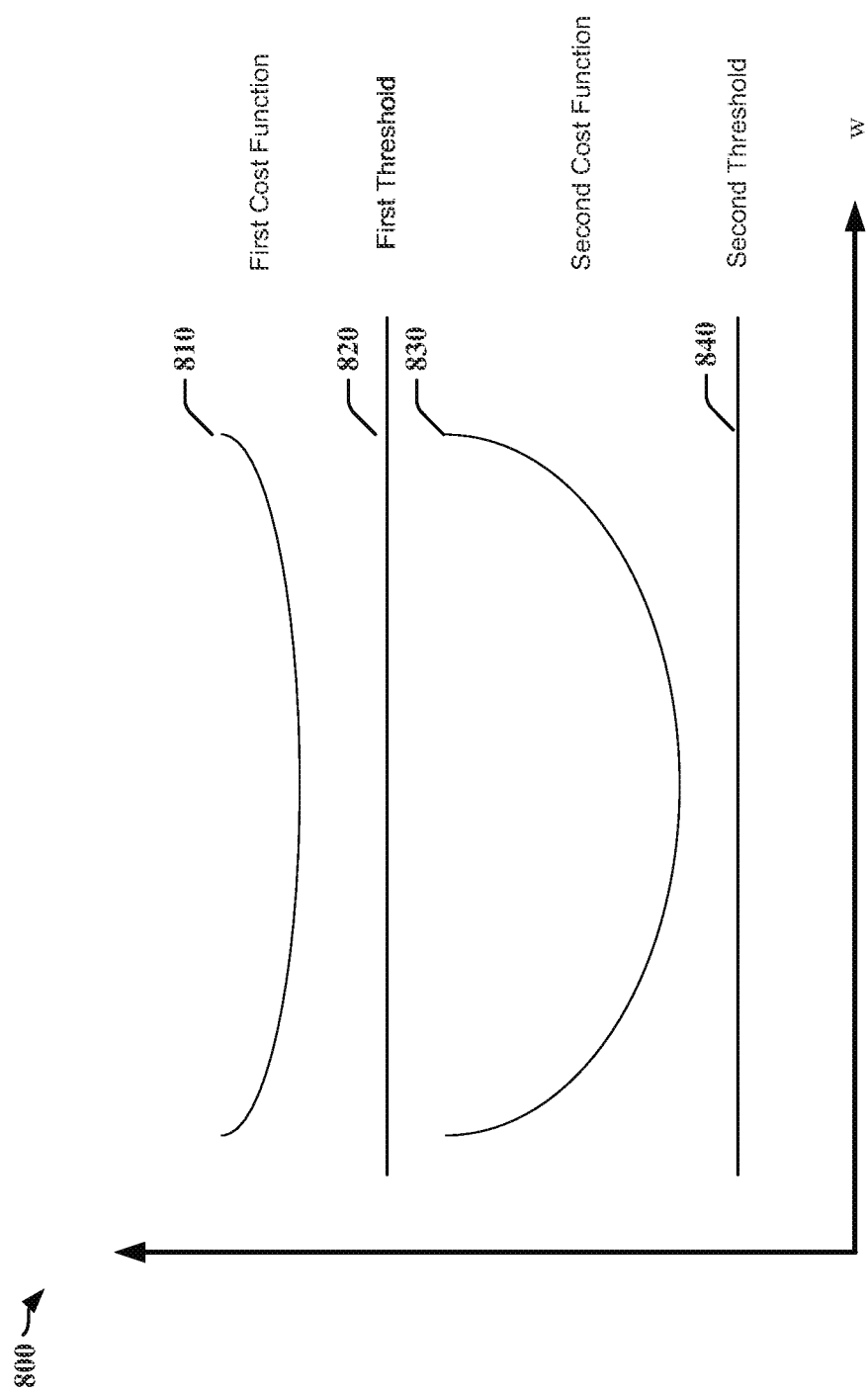
FIG. 8 illustrates an exemplary cost function graph showing two cost functions measured against two cost function thresholds.

In various examples, the measurement of an interference signal in the guard region may be conditioned by a comparison of a cost function C(W) as a function of coefficients W to a pre-determined cost function threshold. FIG. 8 illustrates an exemplary cost function graph 800 showing two cost functions measured against two cost function thresholds. In various examples, the cost functions may represent mean square error (MSE) metrics. The cost function graph 800 shows a first cost function threshold and a second cost function threshold that may be used as metrics for updating coefficients using the measurement of an interference signal from the guard region. In a first example scenario (example scenario 1), the first cost function 810, shown at the upper part of FIG. 8, exceeds the first cost function threshold 820. This would indicate that there is a strong desired receive signal, and thus, no updating of the coefficients to an AIC circuit (e.g., AIC circuit 416 shown in FIG. 4) for interference cancellation may be required. In a second example scenario (example scenario 2), the second cost function 830, shown in the middle part of FIG. 8, is less than the first cost function threshold 820 but greater than the second cost function threshold 840. This would indicate that there is a weak or no desired receive signal relative to the interference signal. Thus, an update of the coefficients should be performed and applied to the AIC circuit to generate an output that can cancel the interference signal. In various examples, the coefficients may be updated based on the measurement of the interference signal in the guard region. And, the updated coefficients are then inputted to the AIC circuit (e.g., AIC circuit 416 shown in FIG. 4) to generate an output that will be provided to the receiver for interference cancellation. In a third example scenario (example scenario 3), if the cost function is below the second cost function threshold (not depicted in FIG. 8), this would indicate that the interference signal is negligible. Hence, in various examples, when it is determined that the cost function is below the second cost function threshold (i.e., the interference signal is negligible), interference cancellation may be disabled.

In various examples, the cost function thresholds may be based on one or more of the following: interference level, desired received signal level desired received signal level to interference and/or noise level. The desired received signal level, interference level and/or noise level may be absolute levels (e.g., measured in Watts, dBm, flux density, etc.) or may be relative levels to each other (e.g., in normalized units, dB, nepers, etc.).

A received signal strength indication (RSSI) may provide an estimate of the sum of the interference signal, a desired receive signal, and noise. The relative signal levels of the interference signal, the desired receive signal, and the noise determine whether the computed cost function will fall above, below or between the first and second cost function thresholds. When the computed cost function falls between the first cost function threshold and the second cost function threshold, this indicates that the measurement of the interference signal is clean (i.e., having minimal or no presence of desired receive signal). That is, as indicated above, in some examples the cost function may be a received signal strength indication (RSSI) of the measurement of the interference signal within the guard region when there is minimal or no presence of the desired receive signal. Here, it may be assumed that the noise is also negligible. Another criterion for indicating that the measurement of the interference signal is clean or not is based on a signal-to-noise ratio measurement, for example, signal-to-interference plus noise ratio (SINR). With RSSI and a clean estimate of the interference signal, the SINR may be constructed and may be used as an indicator to turn on or off the cancellation logic within a coefficient controller (e.g., the coefficient controller 450 in FIG. 4). A clean estimate of the interference signal means that noise may be neglected.

In various examples, comparing cost functions, which are computed from coefficients based on measurements of interference signals measured in the guard region, to thresholds allows the determination of whether or not to update the coefficients before inputting them into an AIC circuit for interference cancellation. In various examples, the thresholds are used to filter out undesired sources in the guard band.

Figure 9:
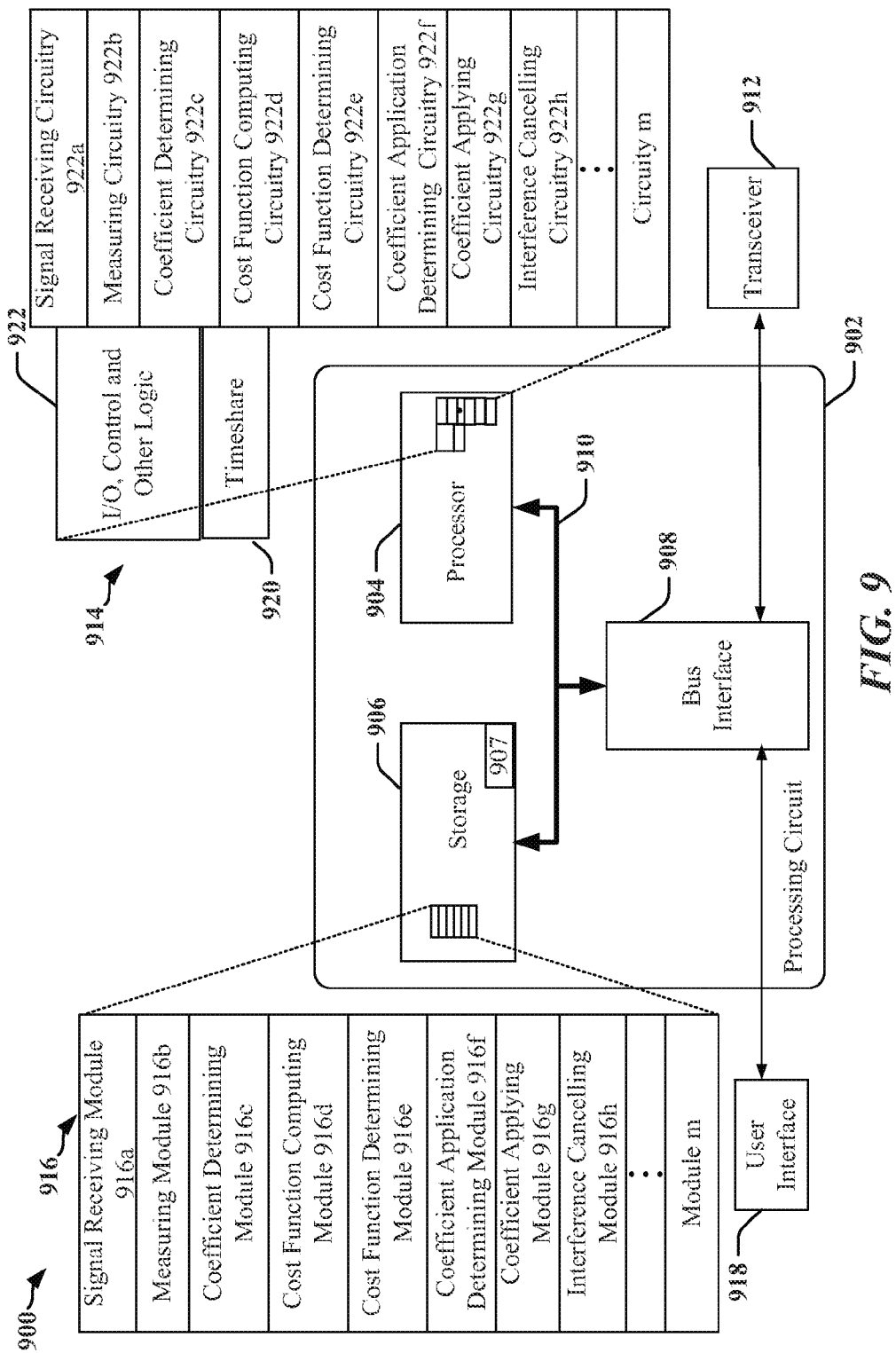
FIG. 9 is a conceptual diagram illustrating an exemplary hardware implementation for an apparatus employing a processing circuit that may be configured to perform one or more functions disclosed herein.

FIG. 9 is a conceptual diagram 900 illustrating an exemplary hardware implementation for an apparatus employing a processing circuit 902 that may be configured to perform one or more functions disclosed herein. In accordance with various aspects of the disclosure, an element, or any portion of an element, or any combination of elements as disclosed herein may be implemented using the processing circuit 902. The processing circuit 902 may include one or more processors 904 that are controlled by some combination of hardware and software modules. Examples of processors 904 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 904 may include specialized processors that perform specific functions, and that may be configured, augmented or controlled by one of the software modules 916. The one or more processors 904 may be configured through a combination of software modules 916 loaded during initialization, and further configured by loading or unloading one or more software modules 916 during operation. In various examples, the software modules 916 may include one or more of the following: codes for maintaining security identifiers (SIDs), codes for controlling the bus 910, codes for transmitting commands, etc.

In the illustrated example, the processing circuit 902 may be implemented with a bus architecture, represented generally by the bus 910. The bus 910 may include any number of interconnecting buses and bridges depending on the specific application of the processing circuit 902 and the overall design constraints. The bus 910 links together various circuits including the one or more processors 1004, and computer-readable storage medium 906. Computer-readable storage medium 906 may include memory devices and mass storage devices, and may be referred to herein as computer-readable storage media and/or processor-readable storage media. In various examples, the computer-readable storage medium 906 may include a memory 907 for storing, for example, one or more of the following: measurement of the interference signal within a guard region, set of coefficients, cost functions, and/or threshold values.

The bus 910 may also link various other circuits such as timing sources, timers, peripherals, voltage regulators, and power management circuits. A bus interface 908 may provide an interface between the bus 910 and one or more transceivers 912. A transceiver 912 may be provided for each networking technology supported by the processing circuit. In some instances, multiple networking technologies may share some or all of the circuitry or processing modules found in a transceiver 912. Each transceiver 912 provides a means for communicating with various other apparatus over a transmission medium. Depending upon the nature of the apparatus, a user interface 918 (e.g., keypad, display, speaker, microphone, joystick) may also be provided, and may be communicatively coupled to the bus 910 directly or through the bus interface 908.

A processor 904 may be responsible for managing the bus 910 and for general processing that may include the execution of software stored in a computer-readable storage medium that may include the computer-readable storage medium 906. In this respect, the processing circuit 902, including the processor 904, may be used to implement any of the methods, functions and techniques disclosed herein. The computer-readable storage medium 906 may be used for storing data that is manipulated by the processor 904 when executing software, and the software may be configured to implement any one of the methods disclosed herein.

One or more processors 904 in the processing circuit 902 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the computer-readable storage medium 906 or in an external computer-readable storage medium. The external computer-readable storage medium 906 may include a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 906 may also include, by way of example, a carrier wave, a transmission line, and any other suitable medium for transmitting software and/or instructions that may be accessed and read by a computer. Computer-readable storage medium 906 may reside in the processing circuit 902, in the processor 904, external to the processing circuit 902, or be distributed across multiple entities including the processing circuit 902. The computer-readable storage medium 906 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

The computer-readable storage medium 906 may maintain software maintained and/or organized in loadable code segments, modules, applications, programs, etc., which may be referred to herein as software modules 916. Each of the software modules 916 may include instructions and data that, when installed or loaded on the processing circuit 902 and executed by the one or more processors 904, contribute to a run-time image 914 that controls the operation of the one or more processors 904. When executed, certain instructions may cause the processing circuit 902 to perform functions in accordance with certain methods, algorithms and processes described herein.

Some of the software modules 916 may be loaded during initialization of the processing circuit 902, and these software modules 916 may configure the processing circuit 902 to enable performance of the various functions disclosed herein. For example, some software modules 916 may configure internal devices and/or logic circuits 922 of the processor 904, and may manage access to external devices such as the transceiver 912, the bus interface 908, the user interface 918, timers, mathematical coprocessors, and so on. The software modules 916 may include a control program and/or an operating system that interacts with interrupt handlers and device drivers, and that controls access to various resources provided by the processing circuit 902. The resources may include memory, processing time, access to the transceiver 912, the user interface 918, and so on. In various examples, the logic circuits 922 may include one or more of the following: a module/circuit that is configured to receive and process a reference signal representative of an interfering signal transmitted by apparatus 900, a module and/or circuit configured to configure a filter using RF, baseband or digital feedback, and/or a module and/or circuit configured to cancel interference in the RF signal. Additionally, the logic circuits 922 may include one or more of the following circuitry: a signal receiving circuitry 922a for receiving a signal, wherein the received signal includes an interference signal within a spectral region; a measuring circuitry 922b for measuring the received signal to obtain a measurement of the interference signal within a guard region of the spectral region; a coefficient determining circuitry 922c for determining a set of coefficients based on the measurement of the interference signal within the guard region; a cost function computing circuitry 922d for computing a cost function based on the set of coefficients; a cost function determining circuitry 922e for determining if the cost function is between a first threshold and a second threshold to yield a determination; a coefficient application determining circuitry 922f for determining whether to apply the set of coefficients to an AIC circuit coupled to the receiver for the interference cancellation based on the determination; a coefficient applying circuitry 922g applying the set of coefficients to the AIC circuit coupled to the receiver; and/or an interference cancelling circuitry 922h for cancelling interference associated with the interference signal utilizing the AIC circuit with the applied set of coefficients.

Additional circuit(s) may be included and is represented by the dots leading to Circuitry m.

One or more processors 904 of the processing circuit 902 may be multifunctional, whereby some of the software modules 916 are loaded and configured to perform different functions or different instances of the same function. The one or more processors 904 may additionally be adapted to manage background tasks initiated in response to inputs from the user interface 918, the transceiver 912, and device drivers, for example. To support the performance of multiple functions, the one or more processors 904 may be configured to provide a multitasking environment, whereby each of a plurality of functions is implemented as a set of tasks serviced by the one or more processors 904 as needed or desired. In one example, the multitasking environment may be implemented using a timesharing program 920 that passes control of a processor 904 between different tasks, whereby each task returns control of the one or more processors 904 to the timesharing program 920 upon completion of any outstanding operations and/or in response to an input such as an interrupt. When a task has control of the one or more processors 904, the processing circuit is effectively specialized for the purposes addressed by the function associated with the controlling task. The timesharing program 920 may include an operating system, a main loop that transfers control on a round-robin basis, a function that allocates control of the one or more processors 904 in accordance with a prioritization of the functions, and/or an interrupt driven main loop that responds to external events by providing control of the one or more processors 904 to a handling function. In various examples, the software modules may include one or more of the following modules: a signal receiving module 916a for receiving a signal; wherein the received signal includes an interference signal within a spectral region; a measuring module 916b for measuring the received signal to obtain a measurement of the interference signal within a guard region of the spectral region; a coefficient determining module 916c for determining a set of coefficients based on the measurement of the interference signal within the guard region; a cost function computing module 916d for computing a cost function based on the set of coefficients; a cost function determining module 916e for determining if the cost function is between a first threshold and a second threshold to yield a determination; a coefficient application determining module 916f for determining whether to apply the set of coefficients to an AIC circuit coupled to the receiver for the interference cancellation based on the determination; a coefficient applying module 916g applying the set of coefficients to the AIC circuit coupled to the receiver; and/or an interference cancelling module 916h for cancelling interference associated with the interference signal utilizing the AIC circuit with the applied set of coefficients. Additional module(s) may be included and is represented by the dots leading to Module m.

Figure 10:
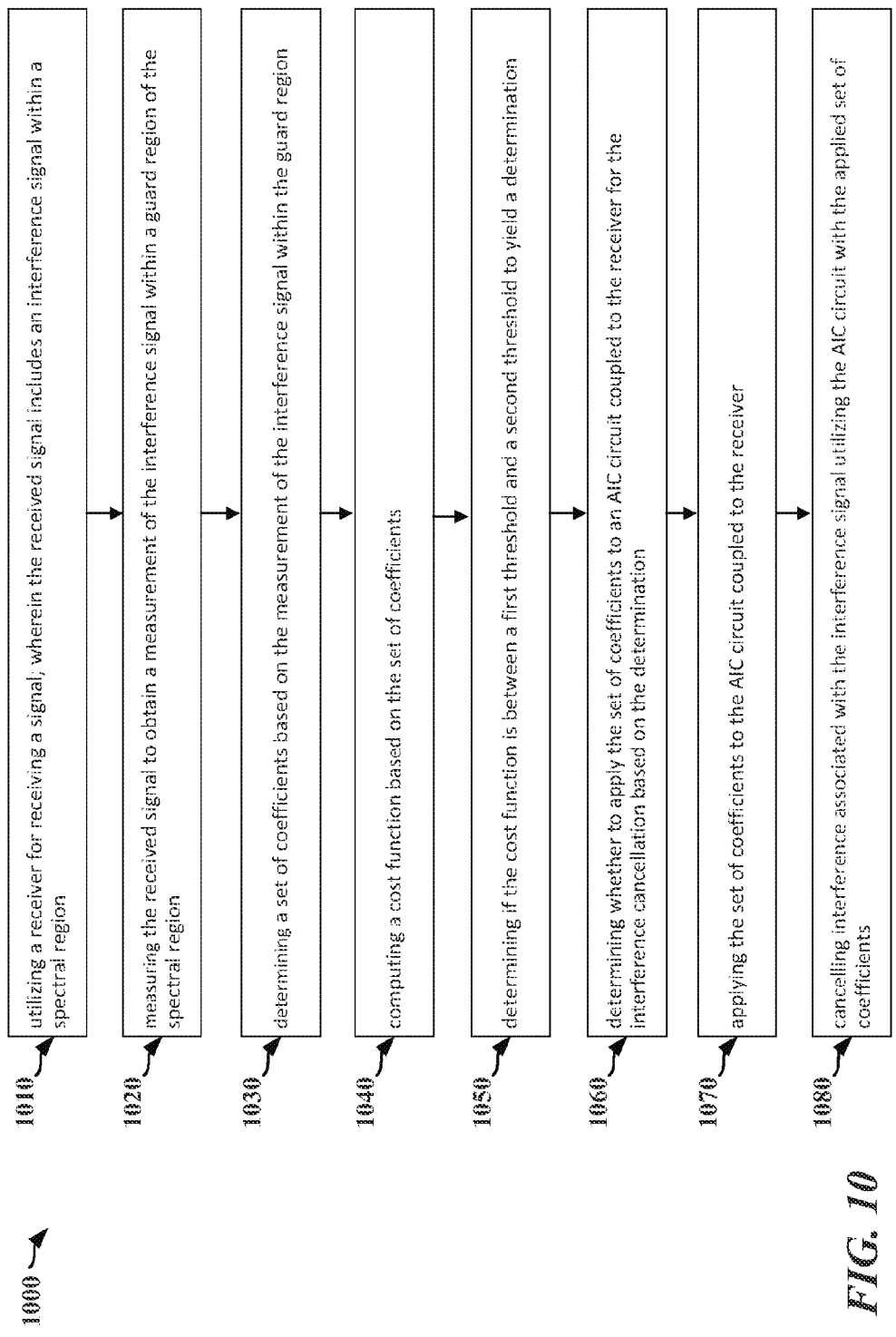
FIG. 10 is a flow diagram illustrating an example of interference cancellation according to some aspects of the disclosure.

FIG. 10 is a flow diagram 1000 illustrating an example of interference cancellation. The method described in FIG. 10 may be performed by a device having one or more transmitters and one or more receivers. In various examples, the one or more transmitters and receivers may both operate in accordance with the same radio access technology (RAT). In another example, the device may be configured to transmit signals in accordance with a first RAT while receiving signals transmitted in accordance with a second RAT. Additionally, the components described in FIGS. 3, 4 and/or 9 may be implemented to perform some or all the blocks of the flow diagram in FIG. 10.

Figure 4:
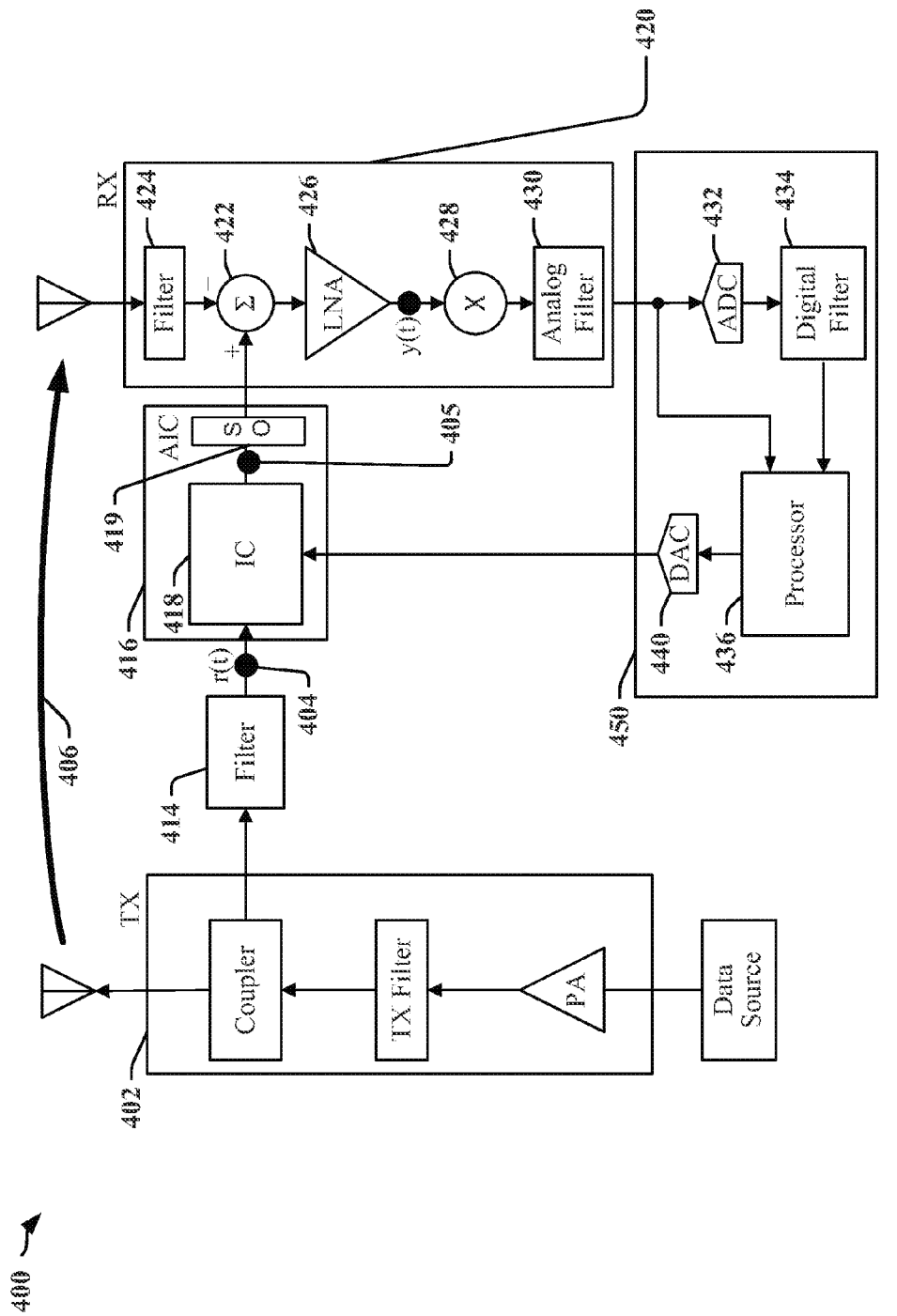
FIG. 4 is a block diagram illustrating an exemplary system for cancelling local interference between a transmitter and a receiver.

In block 1010, a receiver receives a signal. In various examples, the receiver may be receiver 420 as shown in FIG. 4. The received signal may include an interference signal within a spectral region. The spectral region is a range of frequencies between a lower frequency and an upper frequency. In various examples, the receiver may operate in a WiFi band. The WiFi band may include 2.4 GHz, 5 GHz or any other frequencies allowed per IEEE 802.11 protocol. In various examples, the interference signal may be transmitted by a transmitter operating in an LTE band.

In block 1020, the received signal may be measured to obtain a measurement of the interference signal within a guard region of the spectral region. In various examples, the received signal may be measured by filtering it, for example, through a filter. That is, measuring the received signal is performed by filtering the received signal to obtain the measurement of the interference signal within the guard region. In various examples, the filtering is a digital filtering (such as measured through a digital filter). In other examples, the filtering is an analog filtering (such as measured through an analog filter). Other measuring techniques that may be used to obtain the measurement of the interference signal within the guard region may include Fast Fourier Transform (FFT), time-domain convolution and/or spectral estimation. The techniques of FFT, time-domain convolution and/or spectral estimation are well known in the art, and thus, are not described herein. In various examples, a processing circuit 902 or a processor 904, such as those described in FIG. 9 may be used to perform any of the measuring techniques described herein.

In various examples, the guard region includes a guard band. In various examples, the guard region includes one or more guard tones. And, in various other examples, the guard region includes a guard band and one or more guard tones. In various examples, the guard region is an unloaded spectral region. An unloaded spectral region is a region in the frequency domain that is unused for traffic and pilots at all times since it is reserved a priori to be without assigned traffic or pilots. In other examples, the guard region is loaded with a spectral density less than a threshold spectral density value. A spectral density is a distribution of signal energy or signal power versus frequency. The loading may be due to thermal noise, adjacent channel interference, out of band emissions, external interference, intermodulation noise, and/or phase noise, etc. In various examples, the threshold spectral density value may be assigned based on the spectral density in the receive band (see FIG. 7).

In block 1030, a coefficient controller (such as the coefficient controller 450 described in FIG. 4) may be used to determine a set of coefficients based on the measurement of the interference signal within the guard region. The set of coefficients are determined to minimize the interference signal within the guard region. In various examples, the set of coefficients are determined in an iterative or recursive manner for adaptive filtering. In various examples, determining the set of coefficients includes determining coefficient values to minimize a total received signal measurement within the guard region. The total received signal measurement is the total energy or total power of the received signal within the guard region. In various examples, determining the set of coefficients includes determining coefficient values of an adaptive filter, such as an adaptive filter within the AIC filter 416.

In various examples, the set of coefficients is one or more complex pairs of in-phase and quadrature components. And, in various examples, a sign stochastic approximation (such as the example described in FIGS. 6A, 6B and 6C) is used to determine the set of coefficients. In various examples, first set of coefficients is preset based on a nominal interference condition for initializing an AIC circuit (e.g., AIC circuit 416 as illustrated in FIG. 4). This first set of coefficients may be stored in memory.

In block 1040, the coefficient controller (such as the coefficient controller 450 described in FIG. 4) may be used to compute a cost function based on the set of coefficients. In various examples, the set of coefficients is a complex pair of in-phase and quadrature components. In other examples, the cost function is a received signal strength indication (RSSI) of the measurement of the interference signal within the guard region.

In block 1050, the coefficient controller (such as the coefficient controller 450 described in FIG. 4) may be used to determine if the cost function is between a first threshold and a second threshold to yield a determination.

In block 1060, the coefficient controller (such as the coefficient controller 450 described in FIG. 4) may be used to determine whether to apply the first set of coefficients to an AIC circuit coupled to the receiver for the interference cancellation based on the determination.

In block 1070, the coefficient controller (such as the coefficient controller 450 described in FIG. 4) may be used to apply the set of coefficients to the AIC circuit coupled to the receiver. The steps in any of the blocks 1030 through 1070 may be performed by a processing circuit or processor residing within the coefficient controller. In various examples, the processing circuit or processor depicted in FIG. 9 may be used to perform one or more steps of blocks 1030 through 1070.

In block 1080, a subtractor (such as the subtractor 422 described in FIG. 4) cancels interference associated with the interference signal by utilizing an output of the AIC circuit. The output of the AIC circuit is generated based on the applied set of coefficients. In various examples, the subtractor generates the difference between the output of the AIC circuit and the received signal. Additionally, the components described in FIGS. 4 and/or 9 may be implemented to perform some or all the blocks of the flow diagram in FIG. 10.

Several aspects of a telecommunications system have been presented. As those skilled in the art will readily appreciate, various aspects described throughout this disclosure may be extended to various types of telecommunication systems, network architectures and communication standards.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is not directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, blocks, features and/or functions illustrated in the figures may be rearranged and/or combined into a single component, block, feature or function or embodied in several components, blocks, or functions. Additional elements, components, blocks, and/or functions may also be added without departing from novel features disclosed herein. The apparatus, devices, and/or components illustrated in the various drawings may be configured to perform one or more of the methods, features, or blocks described herein. The novel algorithms described herein may also be efficiently implemented in software and/or embedded in hardware.

It is to be understood that the specific order or hierarchy of blocks in the methods disclosed is an illustration of exemplary processes. Based upon design preferences, it is understood that the specific order or hierarchy of blocks in the methods may be rearranged. The accompanying method claims present elements of the various blocks in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for interference cancellation, comprising:
   utilizing a receiver for receiving a signal, wherein the received signal includes an interference signal within a spectral region;
   measuring the received signal to obtain a measurement of the interference signal within a guard region of the spectral region; and
   determining a set of coefficients based on the measurement of the interference signal within the guard region.

2. The method of claim 1, wherein the determining the set of coefficients comprises using a sign stochastic approximation.

3. The method of claim 1, further comprising:
   computing a cost function based on the set of coefficients;

determining if the cost function is between a first threshold and a second threshold to yield a determination; and
determining whether to apply the set of coefficients to an AIC circuit coupled to the receiver for the interference cancellation based on the determination.

4. The method of claim 3, further comprising:
applying the set of coefficients to the AIC circuit coupled to the receiver; and
cancelling interference associated with the interference signal utilizing the AIC circuit with the applied set of coefficients.

5. The method of claim 3, wherein the cost function is a received signal strength indication (RSSI) of the measurement of the interference signal within the guard region.

6. The method of claim 1, wherein the guard region includes a guard band.

7. The method of claim 1, wherein the guard region includes one or more guard tones.

8. The method of claim 1, wherein the guard region is an unloaded spectral region.

9. The method of claim 1, wherein the guard region is loaded with a spectral density less than a threshold spectral density value.

10. The method of claim 1, wherein the receiver operates in a WiFi band.

11. The method of claim 1, wherein the interference signal is transmitted by a transmitter operating in an LTE band.

12. The method of claim 1, wherein the measuring the received signal is performed by filtering the received signal to obtain the measurement of the interference signal within the guard region.

13. The method of claim 1, wherein the determining the set of coefficients comprises determining coefficient values to minimize a total received signal measurement within the guard region.

14. The method of claim 1, wherein the determining the set of coefficients comprises determining one or more coefficient values of an adaptive filter.

15. An apparatus for interference cancellation, comprising:
a receiver configured to receive a signal, wherein the received signal includes an interference signal within a spectral region;
a filter coupled to the receiver, the filter configured to measure the received signal to obtain a measurement of the interference signal within a guard region of the spectral region; and
a coefficient controller coupled to the receiver, the coefficient controller configured to determine a set of coefficients based on the measurement of the interference signal within the guard region.

16. The apparatus of claim 15, wherein the coefficient controller is configured to use a sign stochastic approximation to determine the set of coefficients.

17. The apparatus of claim 15, further comprising an AIC circuit coupled to the receiver; and wherein the coefficient controller is configured to perform the following:
compute a cost function based on the set of coefficients;
determine if the cost function is between a first threshold and a second threshold to yield a determination; and
apply the set of coefficients to the AIC circuit for the interference cancellation based on the determination.

18. The apparatus of claim 17, further comprising a subtractor coupled to the receiver, the subtractor configured to cancel interference associated with the interference signal utilizing the AIC circuit with the applied set of coefficients.

19. The apparatus of claim 17, wherein the cost function is a received signal strength indication (RSSI) of the measurement of the interference signal within the guard region.

20. The apparatus of claim 15, wherein the guard region includes a guard band.

21. The apparatus of claim 15, wherein the guard region includes one or more guard tones.

22. The apparatus of claim 15, wherein the guard region is an unloaded spectral region.

23. The apparatus of claim 15, wherein the guard region is loaded with a spectral density less than a threshold spectral density value.

24. The apparatus of claim 15, wherein the receiver operates in a WiFi band.

25. The apparatus of claim 15, wherein the interference signal is transmitted by a transmitter operating in an LTE band.

26. An apparatus for interference cancellation, comprising:
at least one processor;
a memory for storing a first set of coefficients for initialization, the memory coupled to the at least one processor;
a receiver configured to receive a signal, wherein the received signal includes an interference signal within a spectral region, the receiver coupled to the at least one processor;
means for measuring the received signal to obtain a measurement of the interference signal within a guard region of the spectral region; and
means for determining a second set of coefficients based on the measurement of the interference signal within the guard region.

27. The apparatus of claim 26, further comprising:
means for computing a cost function based on the second set of coefficients;
means for determining if the cost function is between a first threshold and a second threshold to yield a determination; and
means for determining whether to apply the second set of coefficients to an AIC circuit coupled to the receiver for the interference cancellation based on the determination.

28. The apparatus of claim 27, further comprising:
means for applying the second set of coefficients to the AIC circuit coupled to the receiver; and
means for cancelling interference associated with the interference signal utilizing the AIC circuit with the applied second set of coefficients.

29. A non-transitory computer-readable storage medium storing computer executable code, operable on a device comprising at least one processor; a memory for storing a first set of coefficients for initialization, the memory coupled to the at least one processor; a receiver coupled to the at least one processor, wherein the receiver is configured to receive a signal and wherein the received signal includes an interference signal within a spectral region; and the computer executable code comprising: instructions for causing the at least one processor to measure the received signal to obtain a measurement of the interference signal within a guard region of the spectral region; and instructions for causing the at least one processor to determine a second set of coefficients based on the measurement of the interference signal within the guard region.

30. The non-transitory computer-readable storage medium of claim 29, wherein the computer executable code further comprising: instructions for causing the at least one processor to compute a cost function based on the second set of coefficients; instructions for causing the at least one processor to determine if the cost function is between a first threshold and a second threshold to yield a determination; and instructions for causing the at least one processor to determine whether to apply the second set of coefficients to an AIC circuit coupled to the receiver for the interference cancellation based on the determination.

* * * * *